United States Patent
Pomrehn et al.

(10) Patent No.: US 12,337,963 B2
(45) Date of Patent: Jun. 24, 2025

(54) FOLDING WING TIP FOR AIRCRAFT

(71) Applicant: The Boeing Company, Arlington, VA (US)

(72) Inventors: Gregory Pomrehn, Seattle, WA (US); Kevin Tsai, Redmond, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/453,814

(22) Filed: Aug. 22, 2023

(65) Prior Publication Data

US 2025/0066011 A1 Feb. 27, 2025

(51) Int. Cl.
*B64C 3/56* (2006.01)

(52) U.S. Cl.
CPC ..................................... *B64C 3/56* (2013.01)

(58) Field of Classification Search
CPC .... B64C 3/56; B64C 3/38; B64C 3/54; B64C 3/546; B64C 23/072; B64C 5/10; B64C 5/12
See application file for complete search history.

(56) References Cited

U.S. PATENT DOCUMENTS

| | | | | |
|---|---|---|---|---|
| 3,223,365 A * | 12/1965 | Snook, Jr. | ................ | B64C 3/38 244/90 R |
| 3,333,792 A * | 8/1967 | Alvarez-Calderon | .... | B64C 3/54 244/218 |
| 8,708,286 B2 * | 4/2014 | Sakurai | ..................... | B64C 3/56 403/92 |
| 9,296,469 B2 * | 3/2016 | Santini | ...................... | B64C 3/56 |
| 10,464,658 B2 * | 11/2019 | Harding | .................... | B64C 3/56 |
| 2010/0019080 A1 * | 1/2010 | Schweighart | ............. | B64C 3/56 244/49 |

* cited by examiner

*Primary Examiner* — Joshua J Michener
*Assistant Examiner* — Ryan Andrew Yankey
(74) *Attorney, Agent, or Firm* — Kunzler Bean & Adamson

(57) ABSTRACT

An aircraft wing includes a wing root having a leading edge, a trailing edge, and a distal end. The wing also includes a wing tip and a wing-tip hinge that pivotally couples the wing tip to the wing root and defines a wing-tip axis that is perpendicular to a folding plane. The wing tip is pivotable about the wing-tip axis, within the folding plane, between, and inclusive of, an extended position and a retracted position, relative to the wing root. When in the extended position, the leading edge of the wing tip extends from the leading edge of the wing root in a spanwise direction of the wing root. When in the retracted position, the leading edge of the wing tip extends from the leading edge of the wing root in a chordwise direction of the wing root.

22 Claims, 15 Drawing Sheets

FOLDING WING TIP FOR AIRCRAFT

FIELD

This disclosure relates generally to a folding wing tip for an aircraft, and more particularly to an aircraft wing tip that folds in an aft direction, relative to a wing root.

BACKGROUND

The aviation industry strives for increased aircraft efficiency, which can be primarily measured by reduced fuel burn during flight. One fundamental aspect that influences aircraft efficiency is the aspect ratio of the wing, which represents the ratio of its span to its average chord. Generally, higher aspect ratios lead to reduced aerodynamic drag and improved fuel efficiency. Consequently, aircraft with longer wingspans result in enhanced fuel efficiency over aircraft with shorter wingspans. However, current airport infrastructure often limits the adoption of such configurations due to size constraints at the airport, including taxiway spacing and gate locations. This poses limitations on the adoption of larger aircraft with longer wingspans at many airports. Various attempts have been made to enhance aircraft wing efficiency without increasing wingspan. One attempt, which includes incorporating winglets extending vertically from the wingtips, have demonstrated some fuel efficiency gains, but their benefits may not match those achieved through extended wingspans.

SUMMARY

The subject matter of the present application has been developed in response to the present state of the art, and in particular, in response to the problems of and needs created by, or not yet fully solved by, conventional aircraft wings. Generally, the subject matter of the present application has been developed to provide a folding aircraft wing that overcomes at least some of the above-discussed shortcomings of prior art techniques.

Disclosed herein is a wing for use with an aircraft. The wing includes a wing root including a leading edge, a trailing edge, and a distal end. The wing also includes a wing tip including a leading edge, positioned proximate to the distal end of the wing root. The wing tip is configured to be foldable, relative to the wing root, along a folding plane that is co-planar with or parallel to a wing root plane of the wing root. The wing further includes a wing-tip hinge pivotally coupling the wing tip to the wing root and defining a wing-tip axis that is perpendicular to the folding plane. The wing tip is pivotable about the wing-tip axis, within the folding plane, between, and inclusive of, an extended position and a retracted position, relative to the wing root. When in the extended position, the leading edge of the wing tip extends from the leading edge of the wing root in a spanwise direction of the wing root. When in the retracted position, the leading edge of the wing tip extends from the leading edge of the wing root in a chordwise direction of the wing root. The preceding subject matter of this paragraph characterizes example 1 of the present disclosure.

The wing includes an actuator including a first actuator end and a second actuator end. The first actuator end is mounted to the wing root. The second actuator end is mechanically coupled to the wing tip. The actuator is actuatable to pivot the wing tip relative to the wing root between, and inclusive of, the extended position and the retracted position. The preceding subject matter of this paragraph characterizes example 2 of the present disclosure, wherein example 2 also includes the subject matter according to example 1, above.

The wing includes a bell crank including a first bell-crank end, a second bell-crank end, and a fixed pivot point between the first bell-crank end and the second bell-crank end. The wing also includes a bell-crank hinge defining a bell-crank axis that is parallel to the wing-tip axis. The bell-crank hinge is mounted to the wing root aft of the wing-tip hinge. The first bell-crank end is mounted to the second actuator end. The second bell-crank end is mechanically coupled to the wing tip. The fixed pivot point is pivotally coupled to the bell-crank hinge so that the bell crank is pivotable about the bell-crank axis. The preceding subject matter of this paragraph characterizes example 3 of the present disclosure, wherein example 3 also includes the subject matter according to example 2, above.

The wing includes a wing-tip coupler including a first coupler end and a second coupler end. The first coupler end is mounted to the second bell-crank end of the bell crank. The second coupler end is mounted to the wing-tip. The preceding subject matter of this paragraph characterizes example 4 of the present disclosure, wherein example 4 also includes the subject matter according to example 3, above.

When the wing tip is in the extended position, the wing-tip coupler is at least parallel to a segment of the bell crank that extends from the second bell-crank end to the fixed pivot point of the bell crank. The preceding subject matter of this paragraph characterizes example 5 of the present disclosure, wherein example 5 also includes the subject matter according to example 4, above.

The wing includes at least one wing-tip panel configured to be pivotable, relative to the wing tip, about a panel axis, as the wing tip is pivoted between, and inclusive of, the extended position and the retracted position. The preceding subject matter of this paragraph characterizes example 6 of the present disclosure, wherein example 6 also includes the subject matter according to any of examples 1-5, above.

The wing tip includes a panel cutout defined by a panel-attachment edge and a panel-abutment edge. The at least one wing-tip panel includes a tip-attachment edge, a tip-abutment edge, a wing-abutment edge, and a trailing edge. When in the extended position, the at least one wing-tip panel is pivotally attached to the panel-attachment edge of the wing tip by the tip-attachment edge. Also, when in the extended position, the tip-abutment edge is laterally aligned with the panel-abutment edge of the wing tip. Additionally, when in the extended position, the wing-abutment edge is laterally aligned with the distal end of the wing root. The preceding subject matter of this paragraph characterizes example 7 of the present disclosure, wherein example 7 also includes the subject matter according to example 6, above.

The at least one wing-tip panel includes an upper wing-tip panel and a lower wing-tip panel. The upper wing-tip panel is configured to be pivotable about a first panel axis. The lower wing-tip panel is configured to be pivotable about a second panel axis. The preceding subject matter of this paragraph characterizes example 8 of the present disclosure, wherein example 8 also includes the subject matter according to any one of examples 6 or 7, above.

The wing includes an upper rod including a first upper-rod end and a second upper-rod end. The wing also includes a lower rod including a first lower-rod end and a second lower-rod end. The first upper-rod end is mounted to the wing root at a first location and the second upper-rod end is mounted to an interior surface of the upper wing-tip panel. The first lower-rod end is mounted to the wing root at a second location and the second lower-rod end is mounted to an interior surface of the lower wing-tip panel. The first location on the wing root is below the second location on the wing root. The preceding subject matter of this paragraph characterizes example 9 of the present disclosure, wherein example 9 also includes the subject matter according to example 8, above.

The wing tip includes a panel cutout defined by a panel-attachment edge and a panel-abutment edge, and when in the retracted position, the panel-abutment edge of the wing tip is adjacent to the trailing edge of the wing root. The preceding subject matter of this paragraph characterizes example 10 of the present disclosure, wherein example 10 also includes the subject matter according to any of examples 1-9, above.

Also disclosed herein is a wing-tip assembly that includes a wing tip having a panel cutout defined by a panel-attachment edge and a panel-abutment edge. The wing tip is pivotable about a wing-tip axis. The wing-tip assembly also includes an upper wing-tip panel including a tip-attachment edge and a tip-abutment edge. The upper wing-tip panel being pivotable about a first panel axis that is angled relative to the wing-tip axis. The upper wing-tip panel is pivotally attached to the panel-attachment edge of the wing tip by the tip-attachment edge of the upper wing-tip panel. The wing-tip assembly further includes a lower wing-tip panel including a tip-attachment edge and a tip-abutment edge. The lower wing-tip panel being pivotable about a second panel axis that is parallel to the first panel axis. The lower wing-tip panel is pivotally attached to the panel-attachment edge of the wing tip by the tip-attachment edge of the lower wing-tip panel. The wing tip is pivotable about the wing-tip axis, between, and inclusive of, an extended position and a retracted position. When in the extended position, the tip-abutment edge of the upper wing-tip panel and the tip-abutment edge of the lower wing-tip panel are laterally aligned with the panel-abutment edge of the wing tip. When in the retracted position, the tip-abutment edge of the upper wing-tip panel and the tip-abutment edge of the lower wing-tip panel are unaligned with the panel-abutment edge, such that the tip-abutment edge of the upper wing-tip panel extends vertically upward from the panel-abutment edge of the wing tip and the tip-abutment edge of the lower wing-tip panel extends vertically downward from the panel-abutment edge of the wing tip. The preceding subject matter of this paragraph characterizes example 11 of the present disclosure.

The wing-tip assembly further includes a wing-tip hinge defining the wing-tip axis and configured to pivotally couple the wing tip to a wing root. The preceding subject matter of this paragraph characterizes example 12 of the present disclosure, wherein example 12 also includes the subject matter according to example 11, above.

The wing-tip assembly also includes an actuator mechanically coupled to the wing tip and configured to be actuatable to pivot the wing tip, about the wing-tip axis between and inclusive of, the extended position and the retracted position. The preceding subject matter of this paragraph characterizes example 13 of the present disclosure, wherein example 13 also includes the subject matter according to any one of examples 11 or 12, above.

The wing-tip assembly additionally includes a bell crank including a first bell-crank end, configured to be mounted to the actuator, a second bell-crank end, mechanically coupled to the wing tip, and a fixed pivot point between the first bell-crank end and the second bell-crank end. The fixed pivot point defines a bell-crank axis that is parallel to the wing-tip axis, and pivotally coupling the bell crank to a bell-crank hinge that is configured to be mounted to a wing root. The preceding subject matter of this paragraph characterizes example 14 of the present disclosure, wherein example 14 also includes the subject matter according to example 13, above.

The wing-tip assembly includes a wing-tip coupler including a first coupler end, mounted to the second bell-crank end of the bell crank, and a second coupler end, mounted to the wing tip. The preceding subject matter of this paragraph characterizes example 15 of the present disclosure, wherein example 15 also includes the subject matter according to example 14, above.

The wing-tip assembly includes an upper rod including a first-upper rod end, configured to be mounted to a wing root, and a second-upper rod end, mounted to the upper wing-tip panel. The upper rod is configured to pivot the upper wing-tip panel about the first panel axis. The wing-tip assembly also includes a lower rod including a first-lower rod end, configured to be mounted to the wing root, and a second-lower rod end, mounted to the lower wing-tip panel. The lower rod is configured to pivot the lower wing-tip panel about the second panel axis. The preceding subject matter of this paragraph characterizes example 16 of the present disclosure, wherein example 16 also includes the subject matter according to any one of examples 11-15, above.

Further disclosed within is a method of folding a wing tip of a wing. The method includes pivoting a wing tip, relative to a wing root, about a wing-tip axis that is perpendicular relative to a spanwise direction and a chordwise direction of the wing, in an aft direction from an extended position to a retracted position. The method also includes pivoting the wing tip, relative to the wing root, about the wing-tip axis, in a forward direction, opposite of the aft direction, from the retracted position to the extended position. The preceding subject matter of this paragraph characterizes example 17 of the present disclosure.

The method includes pivoting an upper wing-tip panel, relative to the wing root and the wing tip, about a first panel axis that is angled, relative to the wing-tip axis, in a first direction from the extended position to the retracted position. The method also includes pivoting a lower wing-tip panel, relative to the wing root and the wing tip, about a second panel axis that is parallel to the first panel axis, in a second direction from the extended position to the retracted position. The method further includes inversely pivoting the upper wing-tip panel, relative to the wing root and the wing tip, about the first panel axis, in the second direction, from the retracted position to the extended position. The method also includes inversely pivoting the lower wing-tip panel, relative to the wing root and the wing tip, about the second panel axis, in the first direction, from the retracted position to the extended position. The preceding subject matter of this paragraph characterizes example 18 of the present disclosure, wherein example 18 also includes the subject matter according to example 17, above.

An upper rod includes a first upper-rod end, mounted to the wing root and a second upper-rod end, mounted to the upper wing-tip panel. A lower rod includes a first lower-rod end, mounted to the wing root, and a second lower-rod end, mounted to the lower wing-tip panel. The step of pivoting the upper wing-tip panel includes adjusting an angle of the first upper-rod end, relative to the wing tip, such that the angle increases. The step of pivoting the lower wing-tip panel includes adjusting an angle of the first lower-rod end, relative to the wing tip, such that the angle increases. The step of inversely pivoting the upper wing-tip panel includes adjusting the angle of the first upper-rod end, relative to the wing tip, such that the angle decreases. The step of inversely pivoting the lower wing-tip panel includes adjusting the angle of the first lower-rod end, relative to the wing tip, such that the angle decreases. The preceding subject matter of this paragraph characterizes example 19 of the present disclosure, wherein example 19 also includes the subject matter according to any of example 18, above.

The method includes actuating an actuator mounted to the wing root, at a first actuator end, and mechanically coupled to the wing tip, at a second actuator end, to engage the wing tip to pivot, relative to the wing root. The preceding subject matter of this paragraph characterizes example 20 of the present disclosure, wherein example 20 also includes the subject matter according to any one of examples 17-19, above.

The described features, structures, advantages, and/or characteristics of the subject matter of the present disclosure may be combined in any suitable manner in one or more examples, including embodiments and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example, embodiment, or implementation. In other instances, additional features and advantages may be recognized in certain examples, embodiments, and/or implementations that may not be present in all examples, embodiments, or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter, they are not therefore to be considered to be limiting of its scope. The subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the subject matter of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the subject matter of the present disclosure, however, absent an express correlation to indicate otherwise, an implementation may be associated with one or more examples.

Disclosed herein are examples of an aircraft wing having a folding wing tip. The following provides some features of at least some examples of the folding wing tip. The wing includes a wing root, connected to the fuselage or body of the aircraft and a foldable wing tip attached and positioned adjacent to the wing root's distal end. The wing tip is connected to the wing root via a wing-tip hinge, which allows the wing tip to pivot around a wing-tip axis that is perpendicular to a folding plane of the wing tip, which is generally parallel to or co-planar with a chordwise plane of the wing. The wing tip can be adjusted between, and inclusive of, an extended position and a retracted position, relative to the wing root. In the extended position, the wing is at its full wingspan, such that the wing of the aircraft is capable of flight. In the retracted position, the wing is in a folded position, resulting in a shorter wingspan that can more easily navigate within airport infrastructure. The folding wing tip enables the aircraft to dynamically adjust its wingspan. During flight, the wing tip is extended to increase the wingspan, enhancing aerodynamic efficiency. Conversely, when the aircraft is on the ground or taxiing, the wing tip can be retracted to reduce the wingspan, allowing it to maneuver in tighter spaces or fit into airport facilities designed for aircraft with smaller wingspans. This adaptability of the folding wing tip optimizes fuel efficiency during flight while ensuring compatibility with existing airport infrastructure during ground operations.

Figure 1:
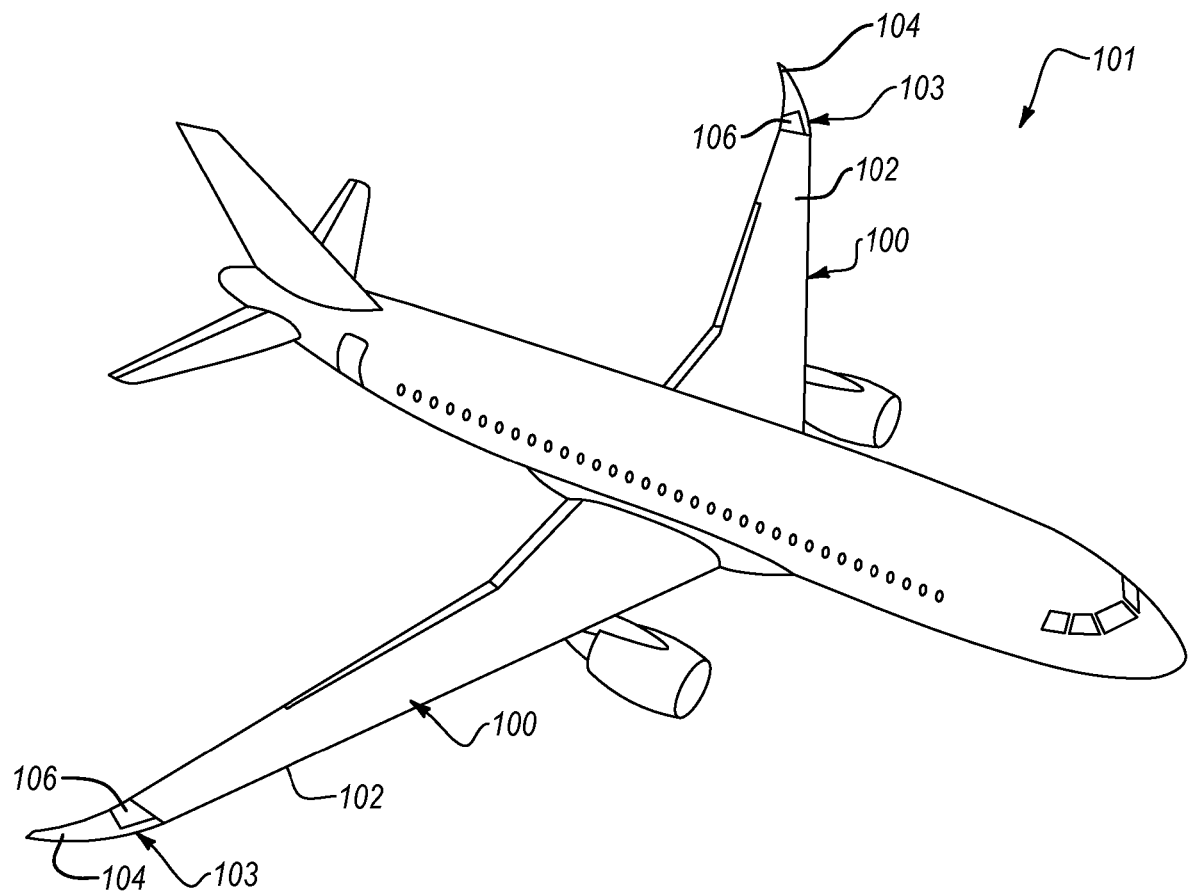
FIG. 1 is a schematic perspective view of an aircraft with a folding wingtip, according to one or more examples of the present disclosure.

Referring to FIG. 1, an aircraft 101 with a folding wing tip 104 is shown. The aircraft 101 includes wings 100 connected to a body (i.e., fuselage) of the aircraft, on opposing sides of the aircraft 101. The wings 100 are in an extended position in FIG. 1, meaning that the aircraft 101 is capable of or enabled for flight. Each wing 100 includes a wing root 102 and a wing tip 104. The wing root 102 is rigidly fixed to the body of the aircraft 101, such that the wing root 102 does not move relative to the body at the point of attachment of the wing root 102 to the body. Of course, the wings 100, including the wing roots 102 and wing tips 104, are allowed to move, oscillate, and/or vibrate to promote absorption of turbulence, which reduces the effect of the turbulence on the body. In contrast, the wing tip 104 is connected to the wing root 102 through a pivot joint, and is pivotable relative to both the wing root 102 and the aircraft 101, allowing the wing tip 104 to pivot and alter its position relative to the wing root 102. In some examples, the wing tip 104 is part of a wing-tip assembly 103, which further includes at least one wing-tip panel 106. The wing-tip panel 106 is capable of pivoting about a panel axis in a direction either upward or downward, relative to the wing root 102, as the wing tip 104 is folded. The movement of the at least one wing-tip panel 106 creates additional space, enabling the wing tip 104 to fold rearwardly or in an aft direction, into a retracted position (i.e., folded).

Figure 2:
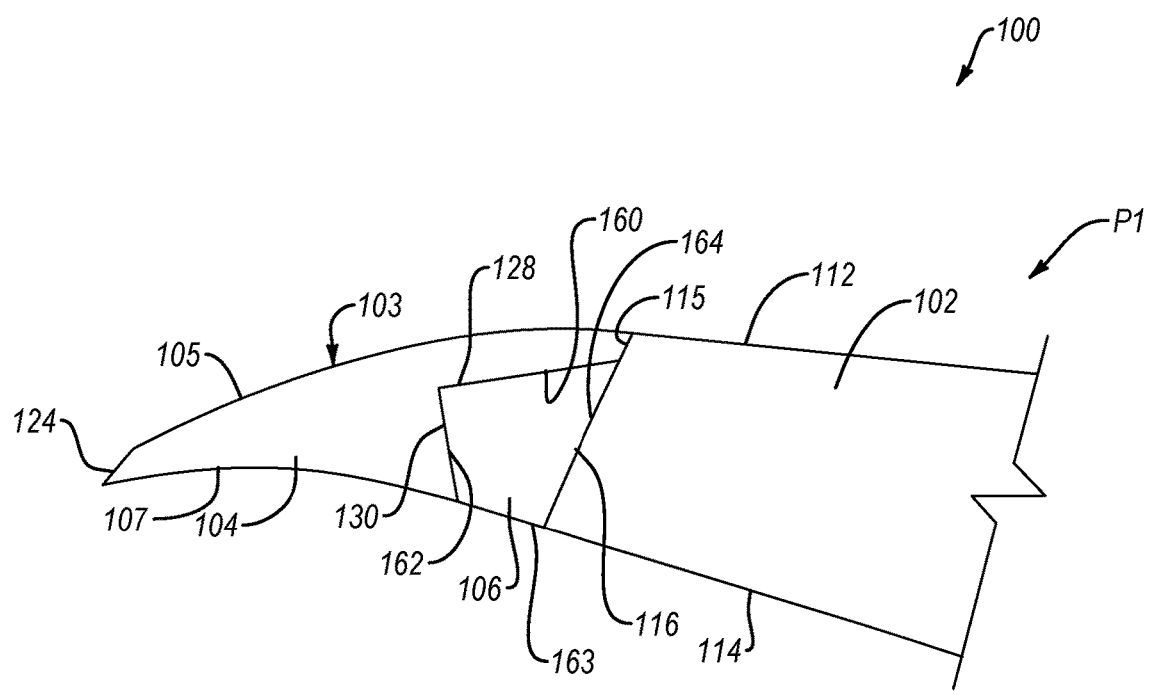
FIG. 2 is a schematic perspective view of a wing tip and wing root of a wing, in an extended position, according to one or more examples of the present disclosure.
Figure 2:
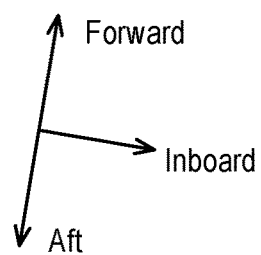
Figure 3:
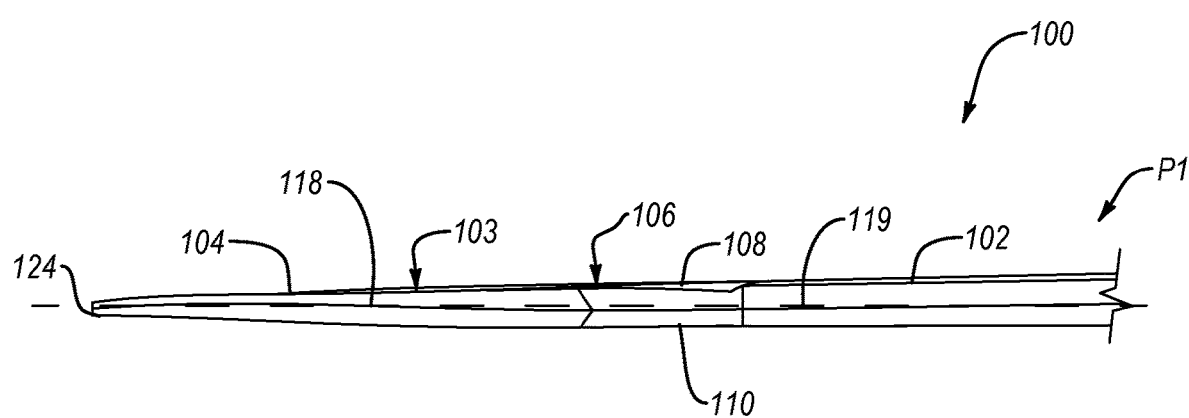
FIG. 3 is a schematic aft-side view of the wing tip and the wing root of the wing of FIG. 2, according to one or more examples of the present disclosure.

One example of an extended position P1 of the wing 100 is shown in FIGS. 2 and 3. The wing 100 includes the wing root 102 and the wing-tip assembly 103. The wing-tip assembly 103 includes the wing tip 104 and at least one wing-tip panel 106. In some examples, the wing-tip assembly 103 includes one wing-tip panel 106. In other examples, the wing-tip assembly 103 includes two wing-tip panels 106, such as an upper wing-tip panel and a lower wing-tip panel (see, e.g., FIG. 4).

The wing root 102 includes a leading edge 112, along a forward side of the wing 100, and a trailing edge 114, along an aft side (e.g., opposing side) of the wing 100. The wing root 102 also includes a distal end 116, that extends between the leading edge 112 and the trailing edge 114 of the wing root 102 and serves as the outermost boundary of the wing root 102 away from the body. In some examples, the distal end 116 is parallel to a chordwise direction of the wing root 102. In other examples, the distal end 116 is at an angle to the chordwise direction of the wing root 102. The distal end 116 typically extends along a straight line connecting the leading edge 112 and the trailing edge 114. However, in some examples, the distal end 116 may include cutouts or have a non-linear edge.

The wing tip 104 includes a leading edge 105, along a forward-side of the wing 100, and a trailing edge 107, along an aft side (e.g., opposing side) of the wing 100. That is, when the wing tip 104 is in the extended position P1, the leading edge 105 is aligned along the forward-side of the wing 100 with the leading edge 112 of the wing root 102, and the trailing edge 107 is positioned along the aft-side of the wing 100 with the trailing edge 114 of the wing root 102, forming a continuous extension of the wing 100. In other words, in the extended position P1, the leading edge 105 of the wing tip 104 extends from the leading edge 112 of the wing root 102 in a spanwise direction of the wing root 102. The spanwise direction refers to a direction along the leading edge 112 of the wing root 102. Additionally, when in the extended position P1, a distal end 124 of the wing tip 104 is at its outward-most position relative to the distal end 116 of the wing root 102 and defines an outward-most end of the wing 100. The wing tip 104 also includes a proximate edge 115 that is positioned immediately adjacent to at least a portion of the distal end 116 of the wing root 102, such that the proximate edge 115 and the distal end 116 are in contact in some examples.

Figure 8:
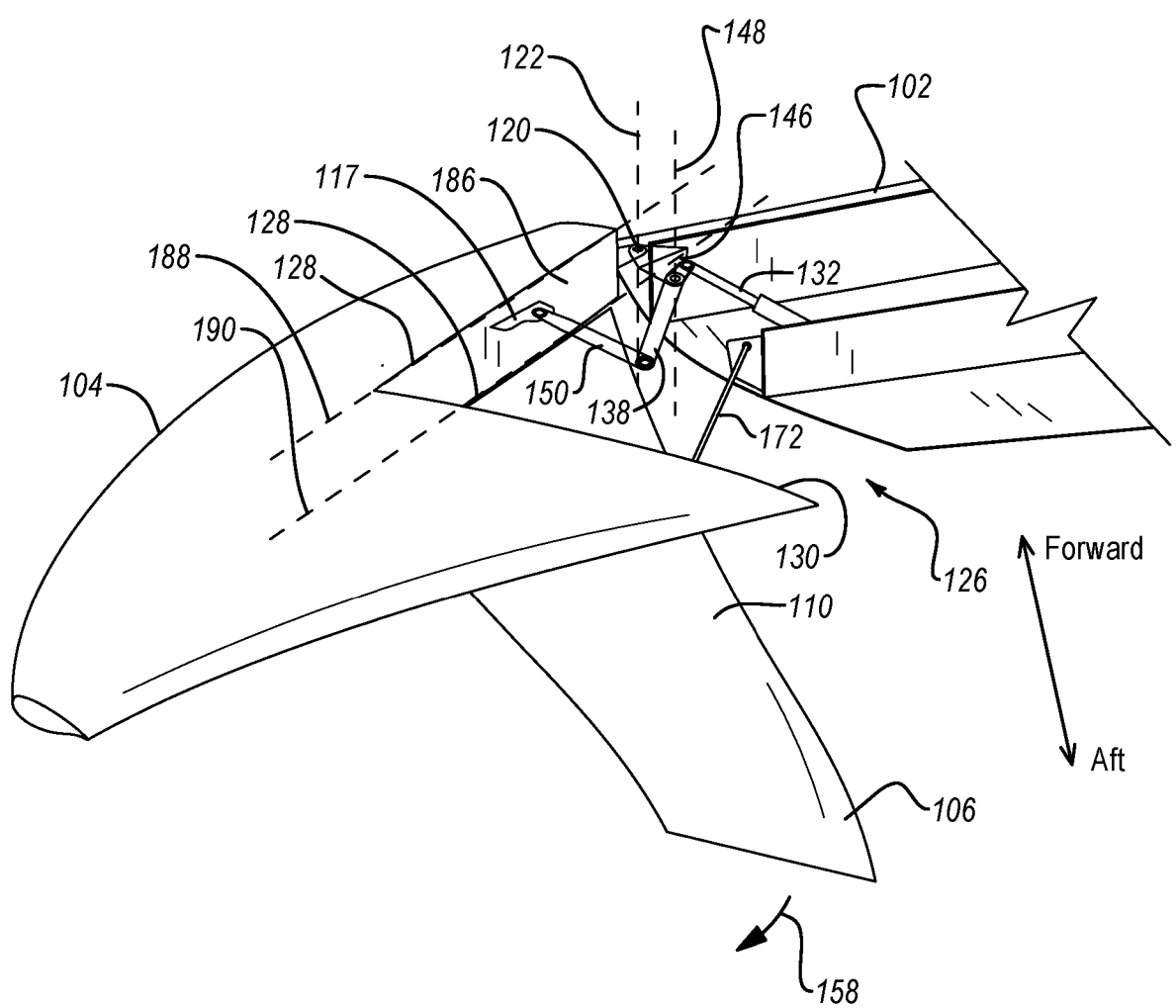
FIG. 8 is a schematic perspective view of a wing tip and wing root of a wing, in a partially folded position, according to one or more examples of the present disclosure.

In certain examples, the wing tip 104 includes a panel cutout 126, which is more clearly depicted in FIG. 8. At least one wing-tip panel 106 is configured to fit within the panel cutout 126, such that when in the extended position P1, the at least one wing-tip panel 106 aligns with each edge of the panel cutout 126 to form a continuous extension of the wing 100, to ensure a smooth and aerodynamically efficient surface during flight. The panel cutout 126 is defined by a panel-attachment edge 128 and a panel-abutment edge 130. In the case of a wing-tip assembly 103 including two wing-tip panels, the wing tip 104 features two parallel panel-attachment edges 128 and two parallel panel-abutment edges 130.

The wing-tip panel 106, or each one of multiple wing-tip panels 106, includes a tip-attachment edge 160, a tip-abutment edge 162, a wing-abutment edge 164 and a trailing edge 163. Through a hinged attachment, the wing-tip panel 106 is pivotally connected at the tip-attachment edge 160 to the panel-attachment edge 128 of to the wing tip 104. When in the extended position P1, the tip-abutment edge 162 is laterally aligned (i.e., abuts) with, the panel-abutment edge 130 of the wing tip 104 and the wing-abutment edge 164 is laterally aligned with the distal end 116 of the wing root 102. Accordingly, the proximate edge 115 of the wing tip 104 and the wing-abutment edge 164 of the wing-tip panel 106 are laterally aligned with the distal end 116 of the wing root 102. Additionally, the trailing edge 163 of the wing-tip panel 106 is positioned along the aft-side of the wing 100 between the trailing edge 114 of the wing root 102 and the trailing edge 107 of the wing tip 104. Referring to FIG. 3, in some examples, the least one wing-tip panel 106 of the wing-tip assembly 103 includes both an upper wing-tip panel 108 and a lower wing-tip panel 110. The upper wing-tip panel 108 is configured to fit within an upper portion of the panel cutout 126. Likewise, the lower wing-tip panel 110 is similarly configured to fit within a lower portion of the panel cutout 126. When in the extended position P1, the trailing edge 163 of the upper wing-tip panel 108 and the trailing edge 163 of the lower wing-tip panel 110 are in contact along the aft-side of the wing 100, such that the trailing edge is continuous along an entirety of the wing 100. That is, the trailing edge of the wing, encompassing any control surfaces such as spoilers, flaps, and ailerons, forms a continuous and cohesive edge that extends along the entire span of the wing 100, without any large gaps or interruptions.

As shown in FIG. 3, in some examples, the wing tip 104 is horizontally aligned with the wing root 102 proximate the attachment of the wing tip 104 to the wing root 102. In other words, although the wing 100 may be upwardly curved away from the body, the wing root 102 is considered to be horizontally aligned with the wing tip 104, and remain horizontally aligned as the wing tip 104 folds relative to the wing root 102. That is, a folding plane 118, in which the wing tip 104 is configured to be foldable within, is co-planar or parallel to, a wing root plane 119 of the wing root 102. The wing root plane 119 is defined by a chordwise direction and a spanwise direction of the wing root 102. In other examples, the wing tip 104 may be angled, relative to the wing root 102, such that the wing 100 is curved or otherwise angled at its proximal end. That is, the folding plane 118 of the wing tip 104 is angled, relative to the wing root plane 119 of the wing root 102, but is parallel to a chordwise direction of the wing 100.

Figure 4:
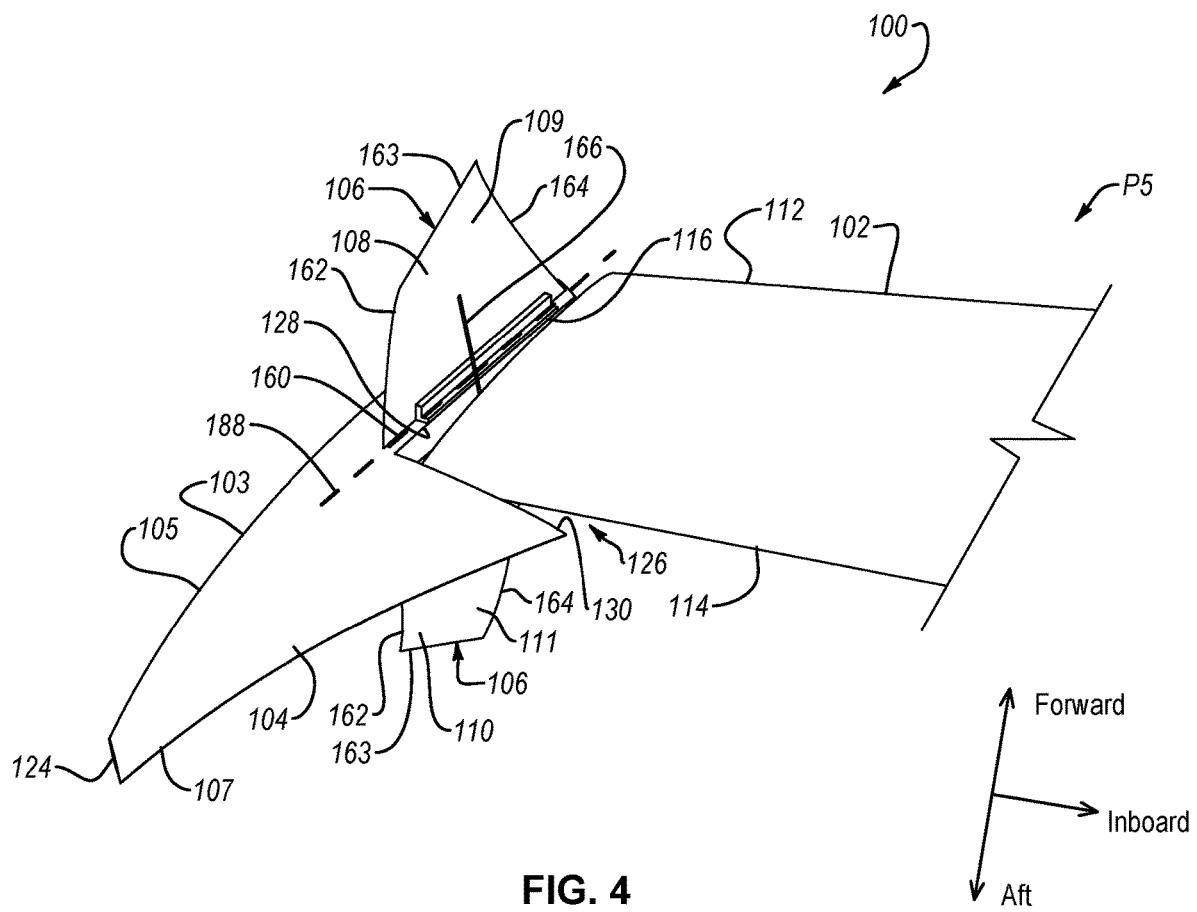
FIG. 4 is a schematic perspective view of a wing tip and wing root of a wing, in a retracted position, according to one or more examples of the present disclosure.
Figure 5:
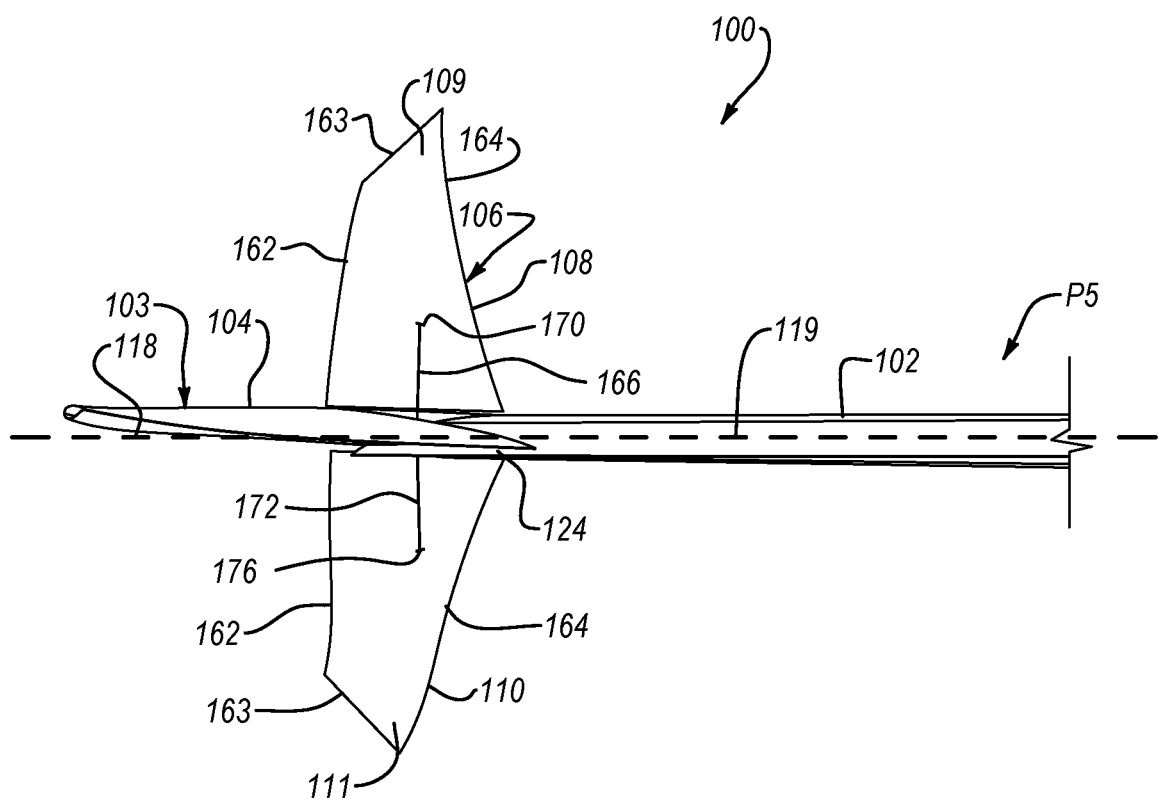
FIG. 5 is a schematic aft-side view of the wing tip and the wing root of the wing of FIG. 4, according to one or more examples of the present disclosure.

One example of a retracted position P5 of the wing 100 is shown in FIGS. 4 and 5. In the retracted position P5, the wing tip 104 is folded, relative to the wing root 102, along the folding plane 118, co-planar with or parallel to the wing root plane 119 of the wing root 102. When in the retracted position P5, the wing 100 may not be capable of or enabled for flight. In the retracted position P5, the leading edge 105 of the wing tip 104 extends from the leading edge 112 of the wing root 102 rearwardly in a chordwise direction away from the wing root 102. That is, the leading edge 105 of the wing tip 104 is angled in a direction toward the trailing edge 114 of the wing root 102, such that the leading edge 105 is no longer aligned with the leading edge 112 of the wing root 102 along the forward side of the wing 100. The chordwise direction refers to a direction along a straight line extending from the leading edge 112 of the wing root 102 to the trailing edge 114 of the wing root 102. In some examples, the chordwise direction is perpendicular to the spanwise direction.

The wing tip 104 is folded such that a portion of the wing root 102 is within the panel cutout 126. In other words, when in the retracted position P5, the panel-attachment edge 128 of the wing tip 104 is adjacent to the distal end 116 of the wing root 102. In some examples, a gap is between the panel-attachment edge 128 of the wing tip 104 and the distal end 116 of the wing root 102, such that the panel-attachment edge 128 and the distal end 116 are not in contact. In other examples, the panel-attachment edge 128 may come into contact with the distal end 116, such that the wing tip 104 is pivotal within the folding plane 118 until the panel-attachment edge 128 contacts the distal end 116. Additionally, in the retracted position P5, the panel-abutment edge 130 of the wing tip 104 aligns adjacent to the trailing edge 114 of the wing root 102. Similar to the panel-attachment edge 128, the panel-abutment edge 130 may either come into direct contact with the trailing edge 114 or exhibit a gap between the two.

In order to accommodate the extension of the wing root 102 within the panel cutout 126, the wing-tip panels(s) 106 must be pivoted away from the panel cutout 126. That is, the upper wing-tip panel 108 is pivoted, relative to the wing tip 104, about a first panel axis 188 as the wing tip 104 is pivoted between, and inclusive of, the extended position P1 and the retracted position P5. Accordingly, the trailing edge 163 of the upper wing-tip panel 108 is positioned above the folding plane 118 of the wing tip 104 in the retracted position P5. Likewise, the lower wing-tip panel 110 is pivoted, relative to the wing tip 104, about a second panel axis 190 (see, e.g., FIG. 8) as the wing tip 104 is pivoted between, and inclusive of, the extended position P1 and the retracted position P5. Accordingly, the trailing edge 163 of the lower wing-tip panel 110 is positioned below the folding plane 118 of the wing tip 104 in the retracted position P5.

Additionally, when in the retracted position P5, the tip-abutment edge 162 of the upper wing-tip panel 108 and the tip-abutment edge 162 of the lower wing-tip panel 110 are not aligned with the corresponding panel-abutment edge 130 of the wing tip 104. Similarly, the wing-abutment edge 164 of the upper wing-tip panel 108 and the wing-abutment edge 164 of the lower wing-tip panel 110 are not aligned with the distal end 116 of the wing root 102.

Referring to FIG. 5, in some examples, the wing tip 104 is horizontally aligned with the wing root 102. In other words, the wing tip 104 and the wing root 102 have a generally flat orientation, relative to each other. The upper wing-tip panel 108 is pivoted upward of the wing tip 104 and the lower wing-tip panel 110 is pivoted downward of the wing tip 104, such that the upper wing-tip panel 108 and the lower wing-tip panel 110 are not horizontally aligned with the wing tip 104. In some examples, the upper wing-tip panel 108 and the lower wing-tip panel 110 may be vertically aligned with the wing tip 104 and the wing root 102. However, in other examples, the upper wing-tip panel 108 and the lower wing-tip panel 110 are angled, albeit not vertically, relative to the wing tip 104 and the wing root 102.

Figure 6:
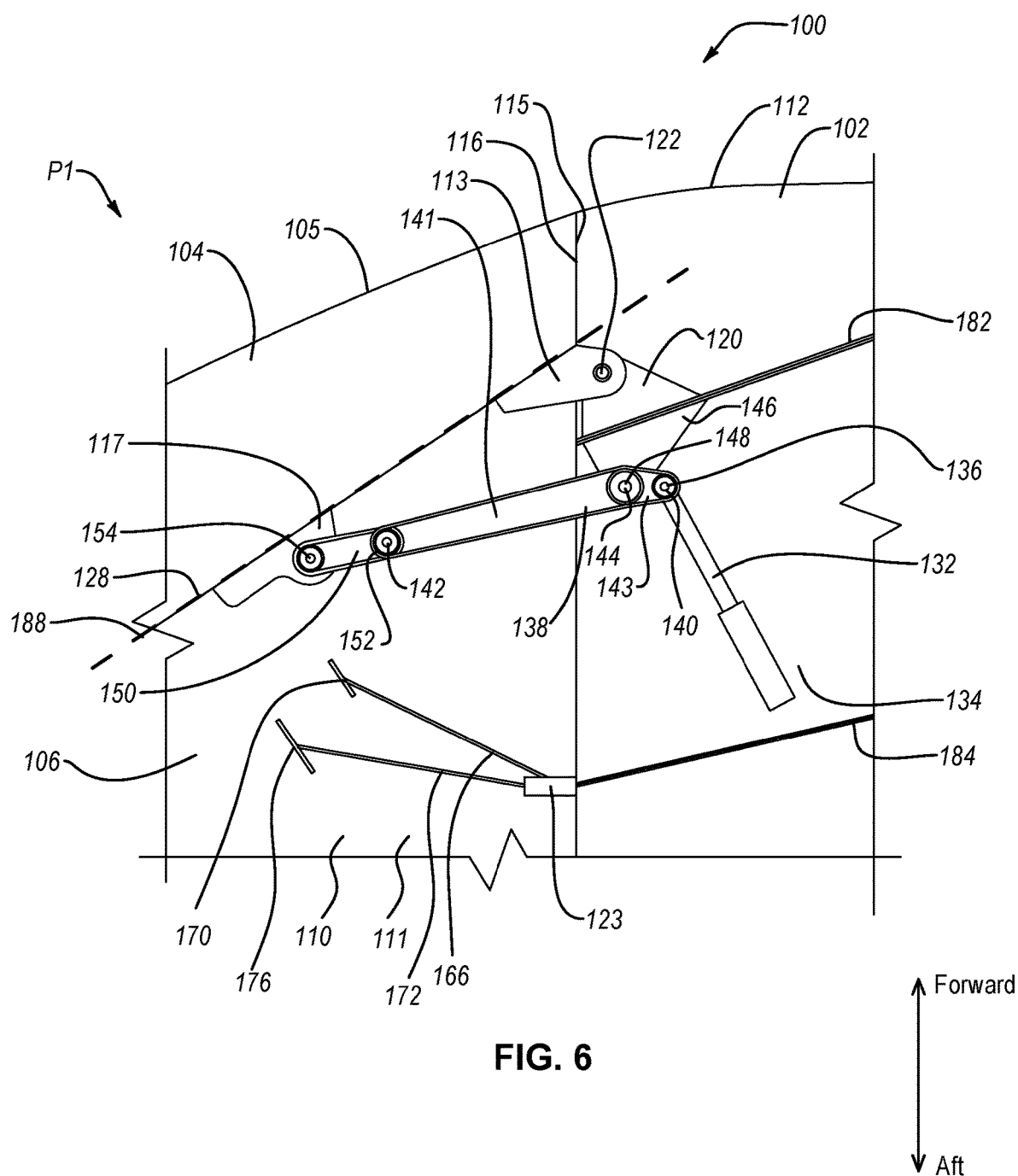
FIG. 6 is a schematic perspective top view of a wing in an extended position, according to one or more examples of the present disclosure.
Figure 7:
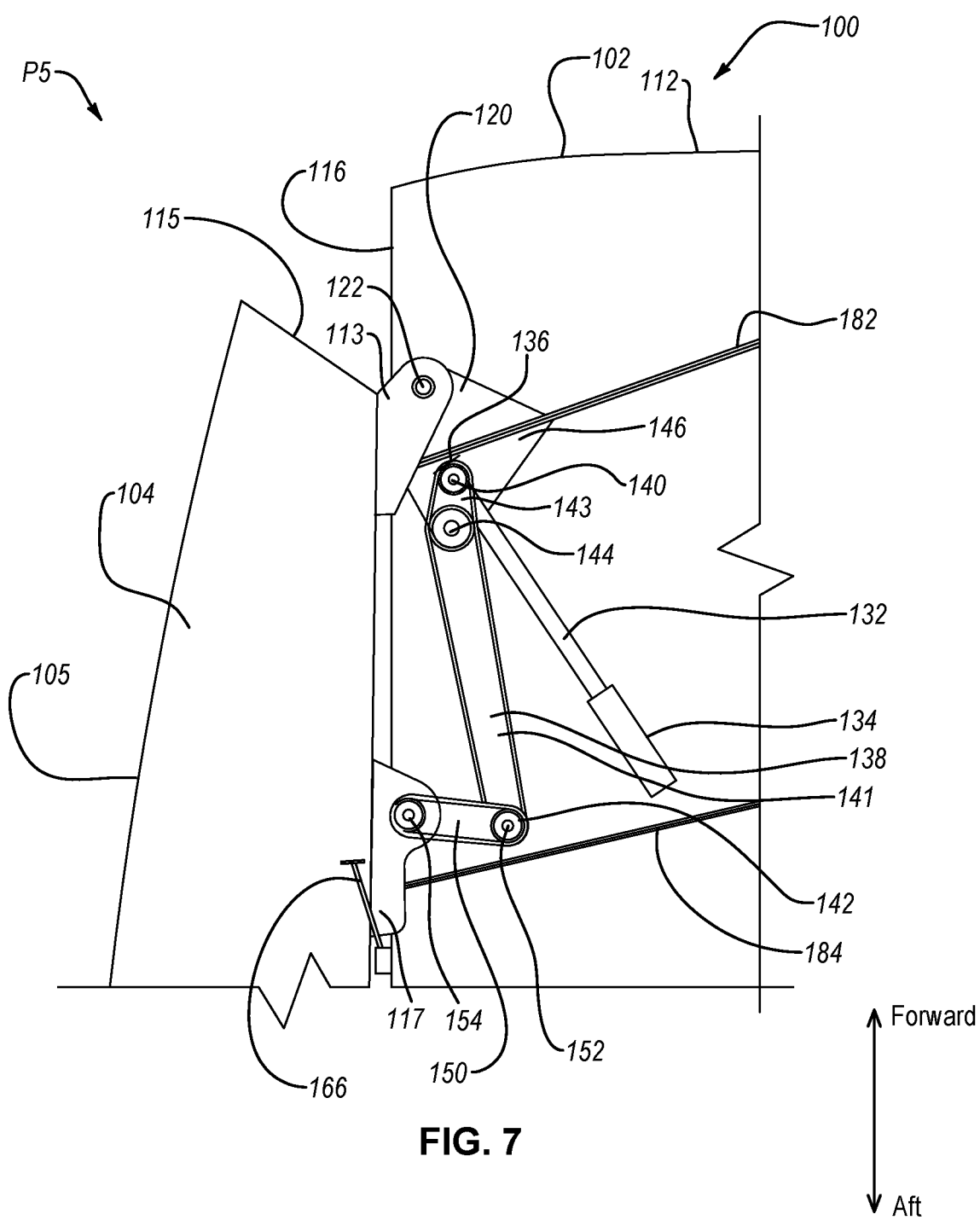
FIG. 7 is a schematic perspective top view of a wing in a retracted position, according to one or more examples of the present disclosure.

Further components of the wing-tip assembly 103 are shown in FIGS. 6 and 7. The approximate location of the components of the wing-tip assembly 103 are visible within the wing root 102 and the panel cutout 126, as an upper panel of the wing root 102 and the upper wing-tip panel 108 are intentionally left out to provide visibility. A pivotal coupling between the wing tip 104 and the wing root 102 is achieved through a wing-tip hinge 120, defining a wing-tip axis 122 that is perpendicular to the folding plane 118 of the wing tip 104 (see, e.g., FIG. 8). In some examples, the wing-tip axis 122 is also perpendicular to the wing root plane 119. The wing-tip hinge 120 is fixed to an interior structure of the wing root 102, adjacent of the leading edge 112. In some examples, the wing-tip hinge 120 is attached forward of a forward spar 182 of wing root 102. In other examples, the wing-tip hinge 120 is directly attached to the forward spar 182 of the wing root 102. The wing tip 104 is attached to the wing-tip hinge 120 by an attachment member 113 at the proximate edge 115.

An actuator 132 facilitates the pivoting movement of the wing tip 104 relative to the wing root 102. The actuator 132 includes a first actuator end 134 mounted to the wing root 102 and a second actuator end 136 mechanically coupled to the wing tip 104. The first actuator end 134 is mounted to interior structure of the wing root 102 aft of the wing-tip hinge 120. In some examples, the first actuator end 134 is mounted to a rear spar 184 of the wing root 102. In other examples, the first actuator end 134 is mounted between the forward spar 182 and the rear spar 184, such as being mounted to a stringer or a rib. The second actuator end 136 may be directly mounted to the wing tip 104, such that actuating the actuator 132 directly pivots the wing tip 104. In other examples, the second actuator end 136 is indirectly mounted to the wing tip 104, such that the second actuator end 136 is mechanically coupled to the wing tip 104 through at least one other component. The actuator 132 may be any type of actuator capable of pivoting the wing tip 104, for example, a linear actuator, a rotary actuator, an electric actuator, a hydraulic actuator, a pneumatic actuator, etc. As shown, the actuator 132 is an actuator that extends in a linear fashion, however, any actuator capable of pivoting the wing tip 104 may be used.

A bell crank 138 or other mechanical component may be used to alter the direction of motion from the actuator 132, which effectively transmits the actuator's motion to the wing tip 104. The bell crank 138 has a first bell-crank end 140, a second bell-crank end 142, and a fixed pivot point 144 positioned therebetween. The first bell-crank end 140 is mounted to the second actuator end 136 and the second bell-crank end 142 is mechanically coupled to the wing tip 104. The fixed pivot point 144 serves as the anchor for the bell crank 138 to the wing root 102 and allows for pivotal movement. To enable rotation, the fixed pivot point 144 is pivotally coupled to a bell-crank hinge 146, defining a bell-crank axis 148. This pivotal coupling enables the bell crank 138 to rotate about the bell-crank axis 148, translating the actuator's motion into controlled wing-tip movement. In some examples, the bell-crank axis 148 is parallel to the wing-tip axis 122. Accordingly, when the bell crank 138 is pivoted by the actuator 132, the rotational movement around the bell-crank axis 148 translates into a corresponding rotational motion of the wing tip 104 about the wing-tip axis 122.

The fixed pivot point 144 may be located at any location between the first bell-crank end 140 and the second bell-crank end 142, effectively dividing the bell crank 138 into two segments, a first segment 141 and a second segment 143. The first segment 141 defines a length from the second bell-crank end 142 to the fixed pivot point 144 and the second segment 143 defines a length from the fixed pivot point 144 to the first bell-crank end 140. Generally, the first segment 141 and the second segment 143 are linear and form an angle, relative to each other, resulting in an overall bell-crank configuration that may be V-shaped, L-shaped, bell-shaped, linearly aligned, or other variations. The first segment 141 and the second segment 143 may have different lengths. For example, when the fixed pivot point 144 is located adjacent to the first bell-crank end 140, the first segment 141 may have a longer length than the second segment 143. As the bell crank 138 rotates around the fixed pivot point 144, it translated the input motion from the actuator 132 at the first bell-crank end 140 to an output motion at the second bell-crank end 142. Accordingly, a small adjustment in the position of the first bell-crank end 140, brought about by the actuator 132, translates into a proportionally large adjustment in the position of the second bell-crank end 142. As a result, the wing tip 104 can undergo a substantial adjustment within the folding plane 118.

In some examples, the bell crank 138 is coupled to a wing-tip coupler 150, configured to couple the bell crank 138 indirectly to the wing tip 104. The wing-tip coupler 150 includes a first coupler end 152 and a second coupler end 154. The first coupler end 152 is mounted to the second bell-crank end 142 and the second coupler end 154 is mounted to the wing tip 104 at a second attachment member 117 at a location adjacent to the panel-attachment edge 128, such as a tip spar (see, e.g., FIG. 8). Generally, the wing-tip coupler 150 extends linearly from the first coupler end 152 to the second coupler end 154.

Figure 9:
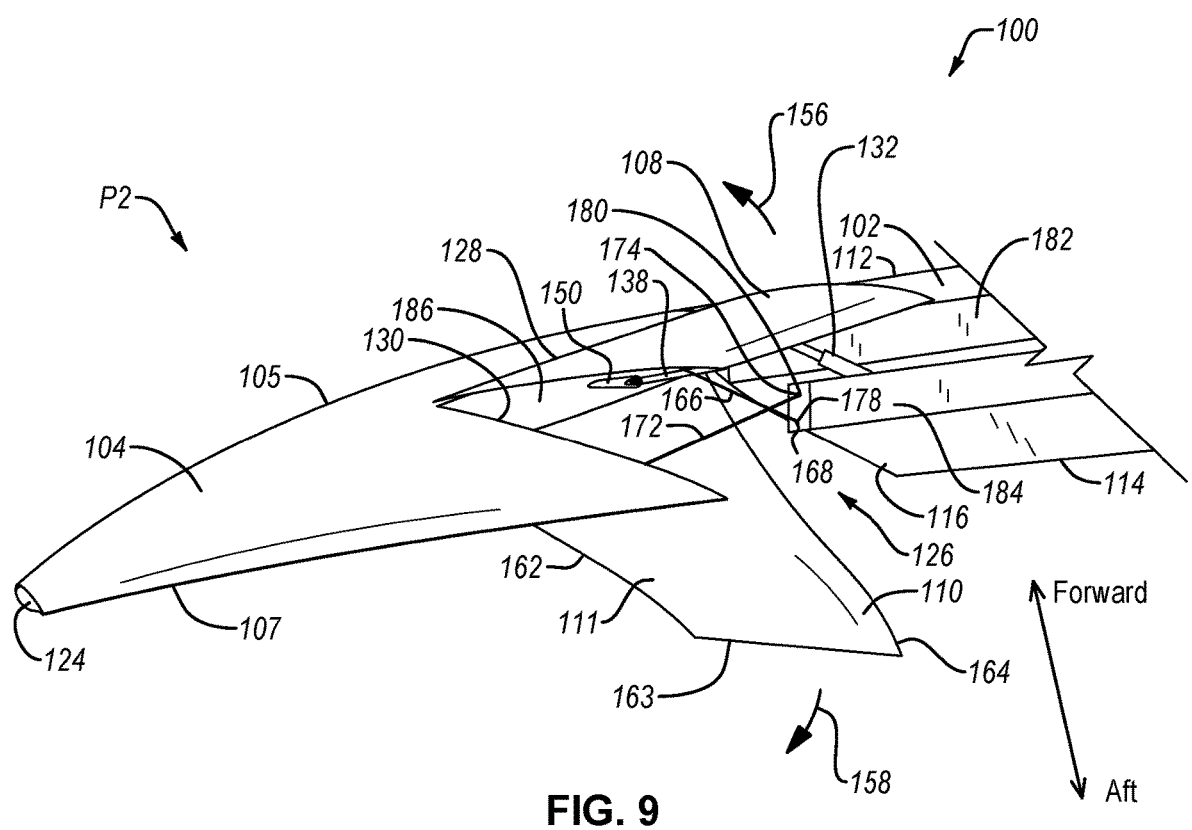
FIG. 9 is a schematic perspective view of a wing, in a first intermediary position, according to one or more examples of the present disclosure.
Figure 11:
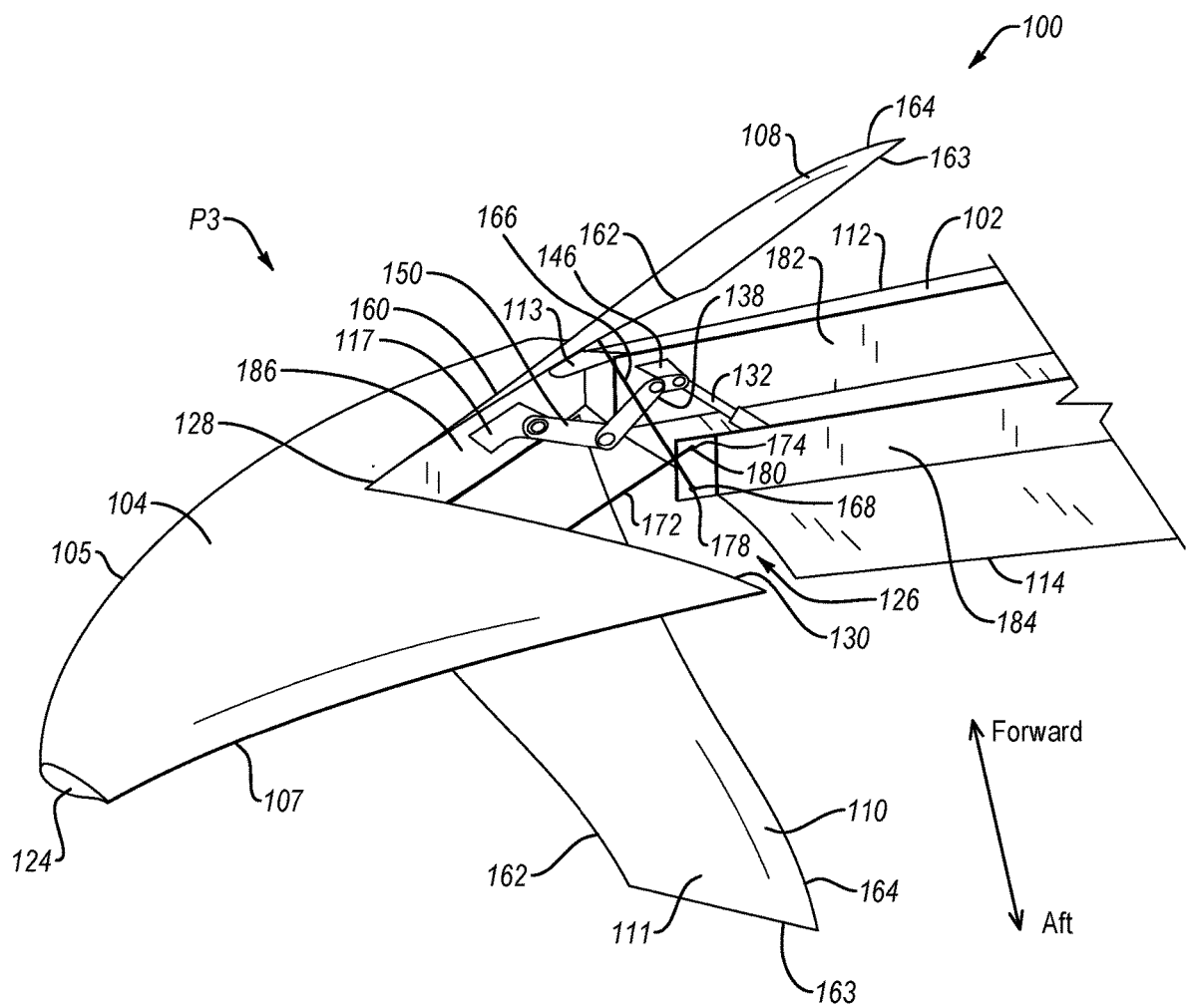
FIG. 11 is a schematic perspective view of a wing, in a second intermediary position, according to one or more examples of the present disclosure.
Figure 13:
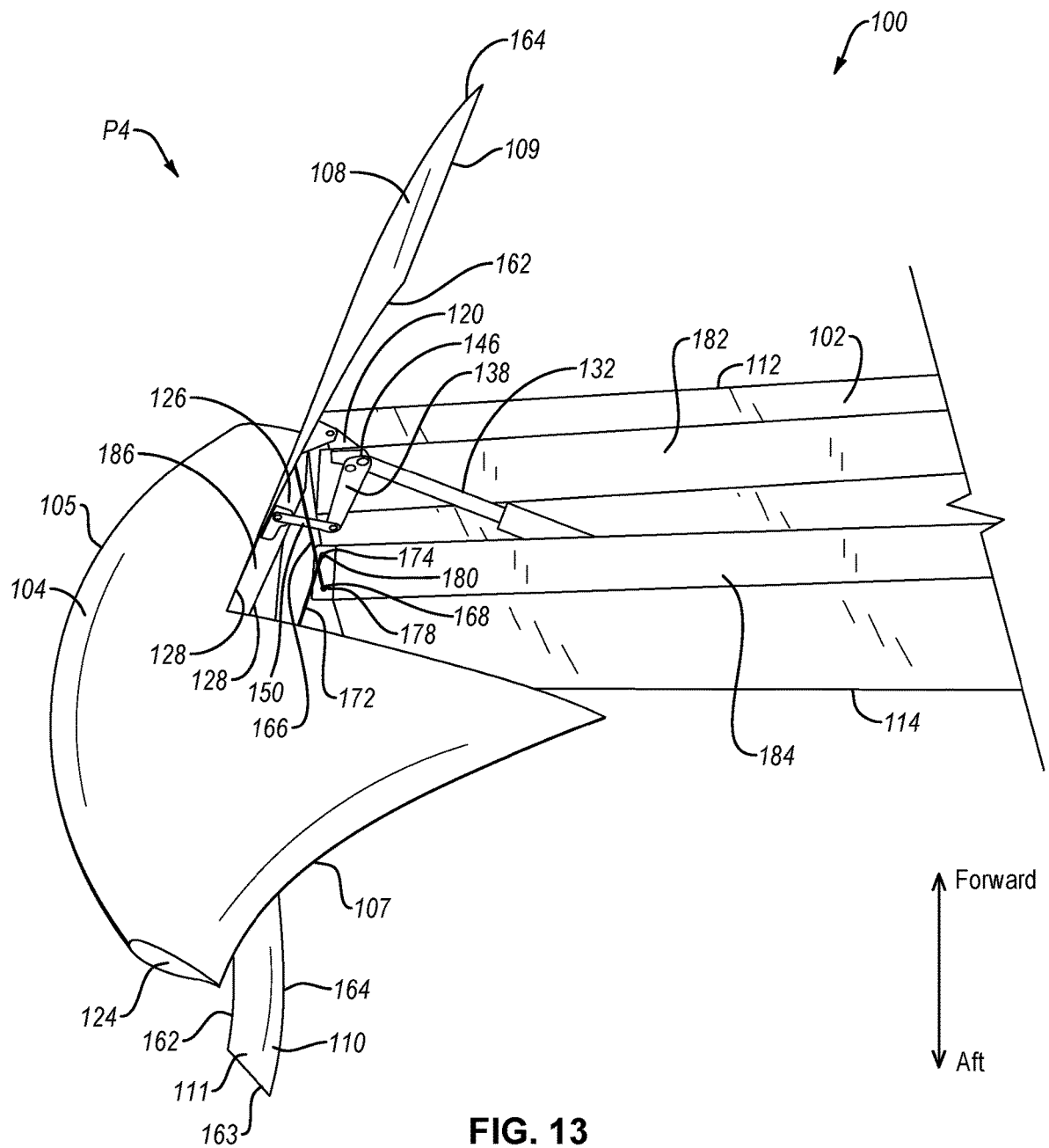
FIG. 13 is a schematic perspective view of a wing, in a third intermediary position, according to one or more examples of the present disclosure.

An upper rod 166 is configured to enable pivotal movement of the upper wing-tip panel 108 about the first panel axis 188. The upper rod 166 extends linearly from a first upper-rod end 168 to a second upper-rod end 170. The first upper-rod end 168 is mounted to the wing root 102 at a first location 178 and the second upper-rod end 170 is mounted to an interior surface 109 of the upper wing-tip panel 108. Similarly, a lower rod 172 is configured to enable pivotal movement of the lower wing-tip panel 110 about the second panel axis 190. The lower rod 172 extends linearly from a first lower-rod end 174 to a second lower-rod end 176. The first lower-rod end 174 is mounted to the wing root 102 at a second location 180 and the second lower-rod end 176 is mounted to an interior surface 111 of the lower wing-tip panel 110. The upper rod 166 and the lower rod 172 are mounted to the wing root 102 aft of the bell-crank hinge 146. In some examples, the upper rod 166 and the lower rod 172 are directly or indirectly mounted to the rear spar 184 of the wing root 102, such as through a third attachment member 123 attached adjacent to the distal end 116 of the wing root 102. As shown in FIGS. 9, 11, and 13, in some examples, the first location 178 on the wing root 102 is mounted below the second location 180 on the wing root 102. This orientation of the rods allows both the upper rod 166 and the lower rod 172 to be angled, relative to the folding plane 118, at all positions, between and inclusive of, the extended position P1 and the retracted position P5. Accordingly, the upper rod 166 maintains a positive angle, relative to the folding plane 118 throughout its movement at all positions, during extension and retraction. On the other hand, the lower rod 172 maintains a negative angle, relative to the folding plane 118 through its movement at all positions, during extension and retraction.

The wing-tip assembly 103, in the extended position P1, is shown in FIG. 6. When in the extended position P1, the actuator 132 is at rest and is not engaged or actuated. The wing tip 104 is fully extended, maximizing the wingspan for the wing 100 for optimal flight performance and efficiency. Additionally, both the upper wing-tip panel 108 and lower wing-tip panel 110 are fitted with the panel cutout 126 of the wing tip 104. The upper rod 166 and the lower rod 172 securely maintain the upper wing-tip panel 108 and the lower wing-tip panel 110, respectively, in the fitted position within the panel cutout 126.

The bell crank 138, together with the wing-tip coupler 150 establish a self-locking mechanism for the wing tip 104. That is, the wing-tip coupler 150 is oriented parallel or slightly beyond parallel with the first segment 141 of the bell crank 138. Effectively, the configuration of the bell crank 138 and the wing-tip coupler 150 prevents the wing tip 104 from moving, relative to the wing root 102, when the wing tip 104 is in the extended position P1. That is, the configuration acts as a safeguard against external forces, like wind or inadvertent manual pressure, accidentally folding the wing tip 104. Specifically, in some examples, the wing-tip coupler 150 incorporates a mechanical stop positioned slightly beyond parallel with the bell crank 138 so that any force applied to the wing tip 104 keeps the wing tip 104 securely locked in place, with unlocking possible only through an actuator force from the actuator 132. The self-locking feature ensures that the wing tip 104 remains stable and secure during flight, providing additional safety and reliability in maintaining the extended wing position. That is, the wing tip 104 can only be folded as intended, by the actuator 132, minimizing the risk of unintentional wing adjustments and ensuring optimal flight control of the wing tip 104.

The retracted position P5, of the wing-tip assembly 103 is shown in FIG. 7. When in the retracted position P5, the actuator 132 is fully actuated and the wing tip 104 is fully folded. That is, in the case of a linear actuator, the actuator 132 is extended to its maximum length, effectively increasing the distance between the first actuator end 134 and the second actuator end 136 to its maximum extent. The actuation of the actuator 132 from the unactuated position to the fully actuated position, leads to a sequence of events, that result in the controlled folding of the wing tip 104, leading to a reduction of the wingspan of the wing 100.

Specifically, the actuation of the actuator 132 pivotally adjusts the bell crank 138, altering its position from an extended position, as shown in FIG. 6, to a retracted position. Reference to "extended position" and "retracted position" are used throughout to refer to the position of a component of the wing-tip assembly 103 when the wing-tip assembly 103 is in the extended position P1 and the retracted position P5, respectively. The first bell-crank end 140 is pivoted about the fixed pivot point 144, to the retracted position forward of the extended position, such that the retracted position is closer to the leading edge 112 of the wing root 102 than in the extended position. Consequently, the second bell-crank end 142 is adjusted from the extended position to the retracted position aft of the extended position, such that the retracted position is closer to the trailing edge 114 of the wing root 102 than in the extended position. That is, the second bell-crank end 142 is moved from its extended position in the space between the upper wing-tip panel 108 and the lower wing-tip panel 110 to the retracted position within the body of the wing root 102.

The pivoting movement of the bell crank 138 unlocks the self-locking feature between the bell crank 138 and the wing-tip coupler 150 ultimately allowing the wing tip 104 to be folded. That is, the movement of the second bell-crank end 142 toward the trailing edge 114 of the wing root 102 unlocks the self-locking feature. Moreover, the movement of the second bell-crank end 142 co-moves the wing-tip coupler 150. Accordingly, the wing-tip coupler 150 is moved from its extended position to a retracted position aft of the extended position. That is, the wing-tip coupler 150 is moved from its extended position in the space between the upper wing-tip panel 108 and the lower wing-tip panel 110 to the retracted position. In some examples, the retracted position is adjacent to the distal end 116 of the wing root 102. In other examples, such as when the panel-attachment edge 128 is closely adjacent to the distal end 116 or in contact with the distal end 116, the wing-tip coupler 150 is partially or entirely within the body of the wing root 102.

The actuation of the actuator 132 not only drives the controlled folding of the wing tip 104 but also simultaneously triggers the pivotal movement of the upper wing-tip panel 108 and the lower wing-tip panel 110. Accordingly, the upper wing-tip panel 108 and the lower wing-tip panel 110 are not independently actuated to induce their movement; instead, the motion of both the upper wing-tip panel 108 and the lower wing-tip panel 110 is seamlessly induced by the actuation of the actuator 132. As the actuator 132 engages, the upper wing-tip panel 108 and the lower wing-tip panel 110 are co-pivoted at the simultaneously, that is at the same time and rate. An angle of the upper rod 166, relative to the folding plane 118, is adjusted from the extended position to the retracted position. That is, the angle of the upper rod 166 in the retracted position is at a more positive angle than the angle of the upper rod 166 in the extended position. For example, the angle may be a 90-degree angle, relative to the folding plane 118, making the upper rod 166 perpendicular to the folding plane 118 in an upward direction. Alternatively, the angle may be an angle less than a 90-degree angle. Likewise, the lower rod 172 undergoes angle adjustment during the transition from the extended position to the retracted position. That is, the angle of the lower rod 172 in the retracted position is at a more negative angle than the angle of the lower rod 172 in the extended position. For example, the angle may be a −90-degree angle, relative to the folding plane 118, making the lower rod 172 perpendicular to the folding plane 118 in a downward direction. In other examples, the angle may be an angle less than a −90-degree angle.

Referring to FIG. 8, the wing-tip assembly 103 is shown with the upper panel of the wing root 102 and the upper wing-tip panel 108 intentionally left out to provide additional visibility. The wing tip 104 is shown folded along the folding plane 118 at an intermediary position between the extended position P1 and the retracted position P5. Additionally, the lower wing-tip panel 110 is pivoted in a second direction 158 downward of the folding plane 118. Accordingly, the area defined by the panel cutout 126 is a smaller area, as the wing tip 104 is folded towards the wing root 102, than the area defined by the panel cutout 126 when the wing tip 104 is in the extended position P1. A forward spar 182 and the rear spar 184 are shown extending parallel to each other along a length of the wing root 102. The wing-tip axis 122 of the wing-tip hinge 120 and the bell-crank axis 148 of the bell crank 138 are shown. The wing-tip axis 122 is perpendicular to the folding plane 118 of the wing tip 104, such that the wing tip 104 remains perpendicular to the wing-tip axis 122 while the wing tip 104 is folded between, and inclusive of, the extended position P1 and the retracted position P5. In some cases, the wing-tip axis 122 is also perpendicular to the wing root plane 119 of the wing root 102. Additionally, the bell-crank axis 148 is parallel to the wing-tip axis 122. The wing-tip hinge 120 is mounted to the forward-side of the forward spar 182 and the bell-crank hinge 146 is mounted to the aft-side of the forward spar 182.

In some examples, a tip spar 186, a structural spar within the wing tip 104, is shown corresponding to the panel-attachment edge 128. Accordingly, the tip spar 186 acts as a secure and robust structure for attaching the wing-tip panel 106. When multiple wing-tip panels 106, such as the upper wing-tip panel 108 and the lower wing-tip panel 110, are attached to the wing tip 104, the wing tip 104 encompasses two panel-attachment edge 128 that are spaced apart, perpendicularly to the folding plane 118. Each panel-attachment edge 128 defines an axis in which the attached wing-tip panel 106 can pivot. For example, a first panel axis 188 is along the panel-attachment edge 128 on an upper surface of the wing tip 104 and a second panel axis 190 is along the panel-attachment edge 128 on a lower surface of the wing tip 104. The wing-tip coupler 150, in some examples, may also be attached to the tip spar 186 at a location along the length of the tip spar between the panel-attachment edge 128 on the upper surface of the wing tip 104 and the panel-attachment edge 128 on the lower surface of the wing tip 104.

Figure 10:
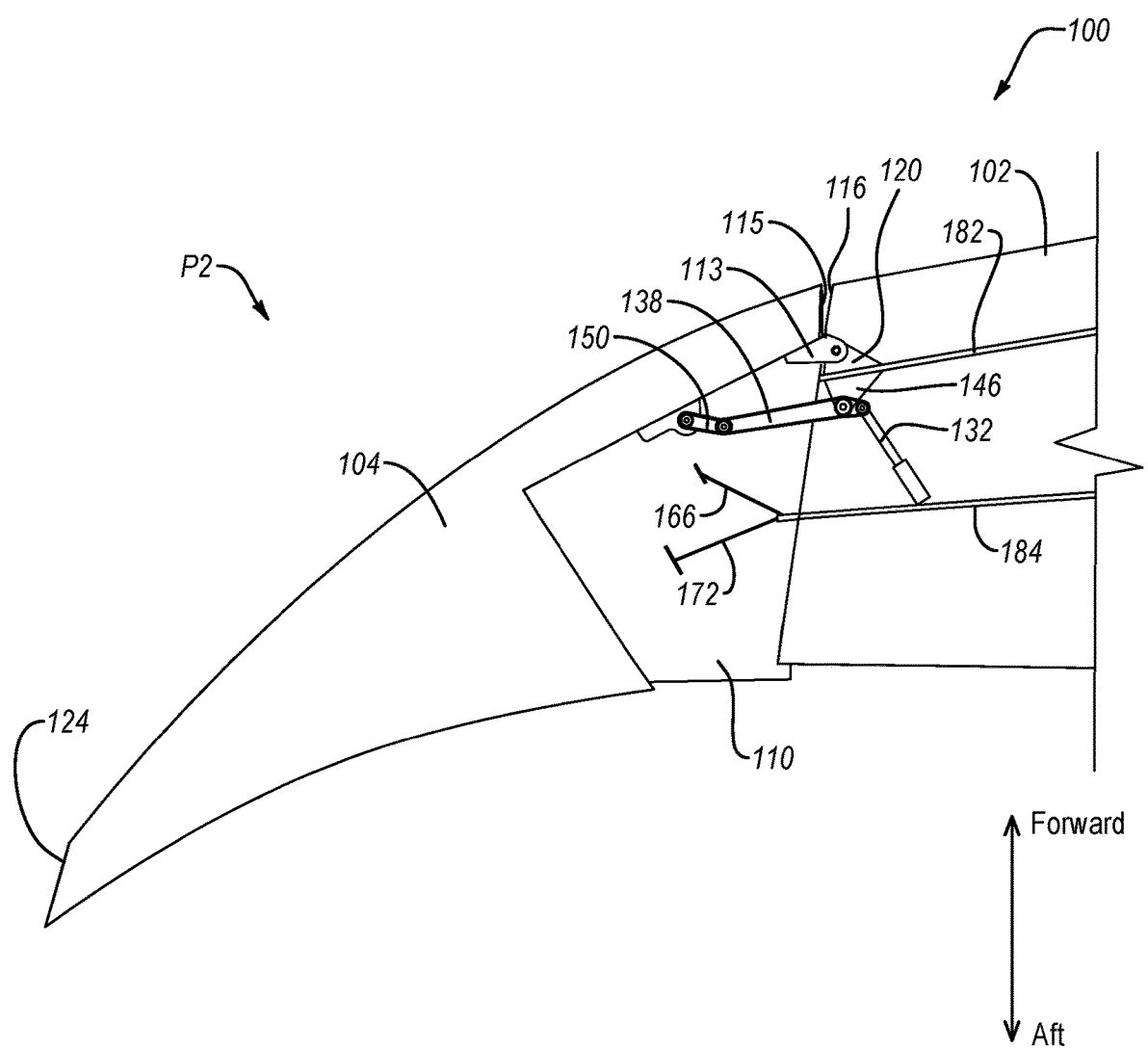
FIG. 10 is a schematic perspective top view of the wing of FIG. 9, according to one or more examples of the present disclosure.
Figure 12:
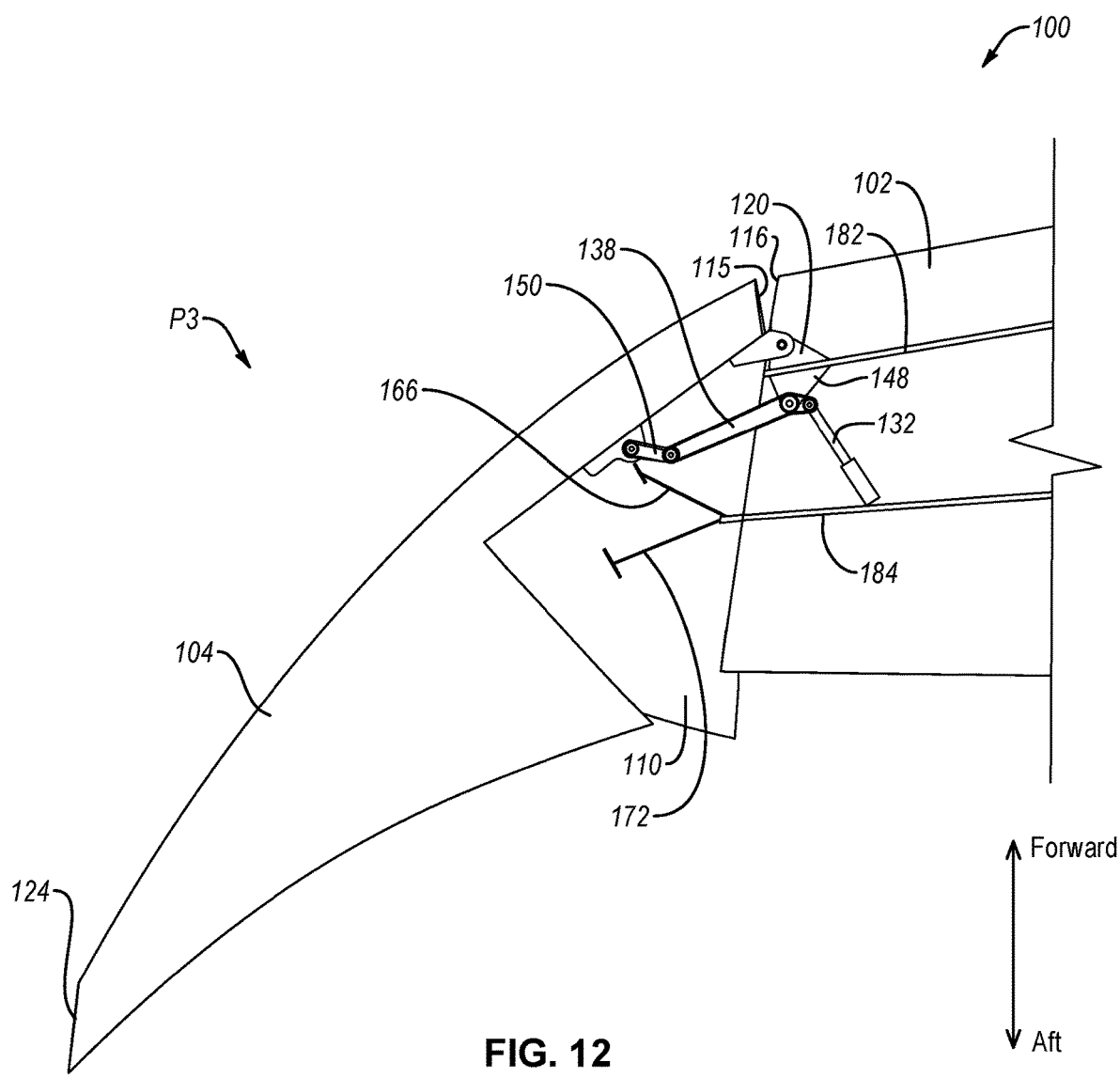
FIG. 12 is a schematic perspective top view of the wing of FIG. 11, according to one or more examples of the present disclosure.
Figure 14:
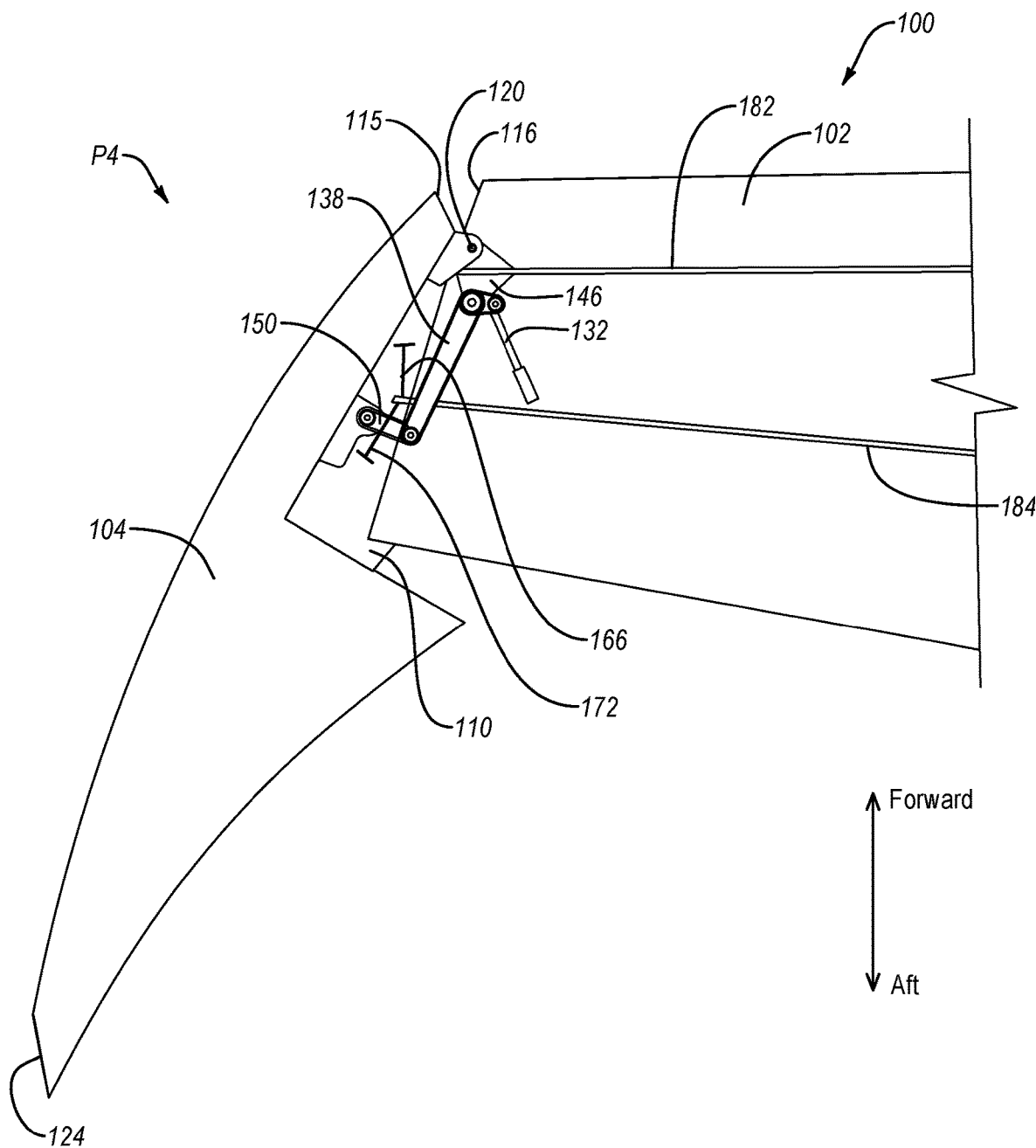
FIG. 14 is a schematic perspective top view of the wing of FIG. 13, according to one or more examples of the present disclosure.

Referring to FIGS. 9-14, representative intermediary positions of the wing tip 104, as it transitions between the extended position P1 and the retracted position P5, are shown. Although an infinite number of intermediary positions can exist between the extended position P1 and the retracted position P5, three illustrative intermediary positions are shown to demonstrate the functionality and approximate positions of the components of the wing-tip assembly 103. FIGS. 9, 11, and 13 illustrate an aft-side view the wing tip 104, the upper wing-tip panel 108, the lower wing-tip panel 110, and the wing root 102, with an upper panel of the wing root 102 intentionally omitted to enable a view of any components within the wing root 102. FIGS. 10, 12, and 14 illustrate a top view to depict the positioning of the wing tip 104, the lower wing-tip panel 110, and the wing root 102. The upper wing-tip panel 108 and the upper panel of the wing root 102 are intentionally omitted, allowing the internal components of the wing-tip assembly 103 to be visible.

As shown in FIGS. 9 and 10, the wing tip 104 is shown in a first intermediary position P2, relative to the wing root 102. In the first intermediary position P2, the actuator 132 has been actuated to initiate the folding of the wing tip 104 along the folding plane 118 from the extended position P1. Specifically, the actuation of the actuator 132 has started to pivotally adjust the bell crank 138 about the fixed pivot point 144 by altering the position of the first bell-crank end 140 in a direction towards the leading edge 112 of the wing root 102. Consequently, the position of the second bell-crank end 142 is altered in a direction towards the trailing edge 114 of the wing root 102. Accordingly, a portion of the bell crank 138 is moved into the internal space of the wing root 102. As the wing-tip coupler 150 co-moves with the second bell-crank end 142, the position of the wing-tip coupler 150 is altered in a direction towards the distal end 116 of the wing root 102. The wing-tip coupler 150 is within the space between the upper wing-tip panel 108 and the lower wing-tip panel 110. The movement of the wing-tip coupler 150, moves the wing tip 104, to fold the wing tip 104, relative to the wing root 102. The area representing the panel cutout 126, defined by the panel-attachment edge 128 and the panel-abutment edge 130, is smaller than the area representing the panel cutout 126 at the extended position P1, as the panel-abutment edge 130 is pivoted towards the trailing edge 114 of the wing root 102, and the panel-attachment edge 128 is pivoted towards the distal end 116 of the wing root 102.

The actuation of the actuator 132 also drives the simultaneous pivotal movement of the upper wing-tip panel 108 and the lower wing-tip panel 110. The angle of the upper rod 166, relative to the folding plane 118, is at a more positive angle than the angle of the upper rod 166 in the extended position P1, which pivots the upper wing-tip panel 108 about the first panel axis 188 in a first direction 156. The first direction 156 is in an upward direction, relative to the folding plane 118, such that the trailing edge 163 of the upper wing-tip panel 108 extends slightly above the folding plane 118. Likewise, the angle of the lower rod 172, relative to the folding plane 118, is at a more negative angle than the angle of the lower rod 172 in the extended position P1, which pivots the lower wing-tip panel 110 about the second panel axis 190 in a second direction 158. The second direction 158 is a downward direction, relative to the folding plane 118, such that the trailing edge 163 of the lower wing-tip panel 110 extends slightly below the folding plane 118.

As shown in FIGS. 11 and 12, the wing tip 104 is shown in a second intermediary position P3, relative to the wing root 102. In the second intermediary position P3, the actuator 132 remains engaged, continuing its controlled actuator to further fold the wing tip 104 along the folding plane 118, from the first intermediary position P2. As the actuator 132 continues its action, the distal end 124 of the wing tip 104 progressively moves closer to the trailing edge 114 of the wing root 102. Specifically, the actuator 132 continues to pivotally adjust the bell crank 138 about the fixed pivot point 144 to further alter the position of the first bell-crank end 140 in a direction towards the leading edge 112 of the wing root 102. Consequently, the position of the second bell-crank end 142 is further altered in a direction towards the trailing edge 114 of the wing root 102. Accordingly, a larger portion of the bell crank 138 is moved into the internal space of the wing root 102. The position of the wing-tip coupler 150 is further altered in a direction towards the distal end 116 of the wing root 102. The wing-tip coupler 150 is still within the space between the upper wing-tip panel 108 and the lower wing-tip panel 110. The movement of the wing-tip coupler 150, moves the wing tip 104, to fold the wing tip 104, relative to the wing root 102. The area representing the panel cutout 126, defined by the panel-attachment edge 128 and the panel-abutment edge 130, is smaller than the area representing the panel cutout 126 at the first intermediary position P2, as the panel-abutment edge 130 is further pivoted towards the trailing edge 114 of the wing root 102, and the panel-attachment edge 128 is further pivoted towards the distal end 116 of the wing root 102.

The simultaneous pivotal movement of the upper wing-tip panel 108 and the lower wing-tip panel 110 also continues. The angle of the upper rod 166, relative to the folding plane 118, is at a more positive angle than the angle of the upper rod 166 in the first intermediary position P2, further pivoting the upper wing-tip panel 108 about the first panel axis 188 in the first direction 156. The trailing edge 163 of the upper wing-tip panel 108 is further extended above the folding plane 118. Likewise, the angle of the lower rod 172, relative to the folding plane 118, is at a more negative angle than the angle of the lower rod 172 in the first intermediary position P2, further pivoting the lower wing-tip panel 110 about the second panel axis 190 in the second direction 158. The trailing edge 163 of the lower wing-tip panel 110 is further extended below the folding plane 118.

As shown in FIGS. 13 and 14, the wing tip 104 is shown in a third intermediary position P4, relative to the wing root 102. In the third intermediary position P4, the actuator 132 remains engaged, continuing its controller actuator to further fold the wing tip 104 along the folding plane 118, from the second intermediary position P3. As the actuator 132 continues its action, the distal end 124 of the wing tip 104 is progressively moved closer to the trailing edge 114 of the wing root 102. Specifically, the actuator 132 continues to pivotally adjust the bell crank 138 about the fixed pivot point 144 to further alter the position of the first bell-crank end 140 in a direction towards the leading edge 112 of the wing root 102. Consequently, the position of the second bell-crank end 142 is further altered in a direction towards the trailing edge 114 of the wing root 102. Accordingly, a larger portion or an entirety of the bell crank 138 is moved into the internal space of the wing root 102. The position of the wing-tip coupler 150 is further altered in a direction towards the distal end 116 of the wing root 102. A portion of the wing-tip coupler 150 may be within the internal space of the wing root 102 with the remaining portion of the wing-tip coupler 150 still within the space between the upper wing-tip panel 108 and the lower wing-tip panel 110. The area representing the panel cutout 126, defined by the panel-attachment edge 128 and the panel-abutment edge 130, is smaller than the area representing the panel cutout 126 at the second intermediary position P3, as the panel-abutment edge 130 is further pivoted towards the trailing edge 114 of the wing root 102, and the panel-attachment edge 128 is further pivoted towards the distal end 116 of the wing root 102.

The simultaneous pivotal movement of the upper wing-tip panel 108 and the lower wing-tip panel 110 also continues. The angle of the upper rod 166, relative to the folding plane 118, is at a more positive angle than the angle of the upper rod 166 in the second intermediary position P3, further pivoting the upper wing-tip panel 108 about the first panel axis 188 in the first direction 156. The trailing edge 163 of the upper wing-tip panel 108 is further extended above the folding plane 118. Likewise, the angle of the lower rod 172, relative to the folding plane 118, is at a more negative angle than the angle of the lower rod 172 in the second intermediary position P3, further pivoting the lower wing-tip panel 110 about the second panel axis 190 in the second direction 158. The trailing edge 163 of the lower wing-tip panel 110 is further extended below the folding plane 118.

The actuator 132 can remain engaged to further fold the wing tip 104 along the folding plane 118 to the retracted position P5, as shown in FIGS. 4 and 5. Moreover, the actuator 132 can be used to reverse the folding of the wing tip 104 from the retracted position P5 to the extending position P1.

Figure 15:
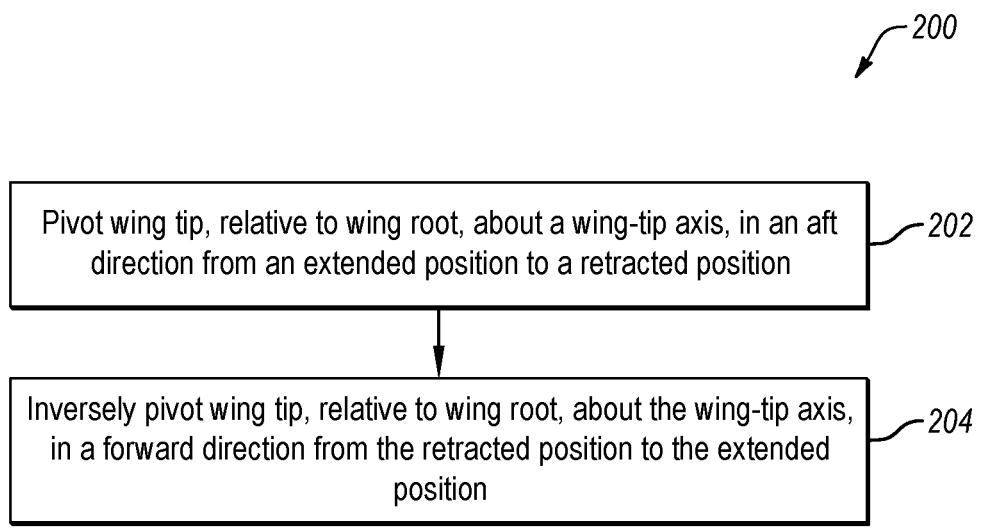
FIG. 15 is a schematic flow diagram of a method of folding a wing tip of a wing, according to one or more examples of the present disclosure.

Referring to FIG. 15, according to some examples, a method 200 of folding a wing tip 104 of a wing 100 is shown. The method 200 includes (block 202) pivoting a wing tip 104, relative to a wing root 102, about a wing-tip axis 122 that is perpendicular relative to a spanwise direction and a chordwise direction of the wing 100, in an aft direction from an extended position P1 to a retracted position P5. As shown in FIGS. 9 through 14, the wing tip 104 is extended to intermediary positions as the wing tip 104 is folded to the retracted positions P5. The method 200 also includes (block 204) pivoting the wing tip 104, relative to the wing root 102, about the wing-tip axis 122, in a forward direction from the retracted position P5 to the extended position P1. The step of pivoting the wing tip 104 from the retracted position P5 to the extended position P1, would be the reverse steps as described according to FIG. 9 through 14. That is, the wing tip 104 would be move from the retracted position P5 through the intermediary positions P4, P3, and P2, until reaching the extended position P1.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the examples herein are to be embraced within their scope.

What is claimed is:

1. A wing for use with an aircraft, the wing comprising:
a wing root comprising a leading edge, a trailing edge, and a distal end;
a wing tip comprising a leading edge, positioned proximate to the distal end of the wing root, and configured to be foldable, relative to the wing root, along a folding plane that is co-planar with or parallel to a wing root plane of the wing root;
a wing-tip hinge pivotally coupling the wing tip to the wing root and defining a wing-tip axis that is perpendicular to the folding plane;
an upper wing-tip panel coupled to the wing tip; and
a lower wing-tip panel coupled to the wing tip, wherein:

the wing tip is pivotable about the wing-tip axis, within the folding plane, between, and inclusive of, an extended position and a retracted position, relative to the wing root;

when in the extended position, the leading edge of the wing tip extends from the leading edge of the wing root in a spanwise direction of the wing root;

when in the retracted position, the leading edge of the wing tip extends from the leading edge of the wing root in a chordwise direction of the wing root;

the upper wing-tip panel is pivotable, relative to the wing tip, and extends vertically upward from the wing tip when the wing tip is in the retracted position; and the lower wing-tip panel is pivotable, relative to the wing tip, and extends vertically downward from the wing tip when the wing tip is in the retracted position.

2. The wing of claim 1, further comprising an actuator comprising a first actuator end and a second actuator end, wherein:

the first actuator end is mounted to the wing root;
the second actuator end is mechanically coupled to the wing tip; and
the actuator is actuatable to pivot the wing tip relative to the wing root between, and inclusive of, the extended position and the retracted position.

3. The wing of claim 2, further comprising:

a bell crank comprising a first bell-crank end, a second bell-crank end, and a fixed pivot point between the first bell-crank end and the second bell-crank end; and a bell-crank hinge defining a bell-crank axis that is parallel to the wing-tip axis, the bell-crank hinge being mounted to the wing root aft of the wing-tip hinge;

wherein:
the first bell-crank end is mounted to the second actuator end;
the second bell-crank end is mechanically coupled to the wing tip; and
the fixed pivot point is pivotally coupled to the bell-crank hinge so that the bell crank is pivotable about the bell-crank axis.

4. The wing of claim 3, further comprising a wing-tip coupler comprising a first coupler end and a second coupler end, wherein:

the first coupler end is mounted to the second bell-crank end of the bell crank; and
the second coupler end is mounted to the wing tip.

5. The wing of claim 4, wherein, when the wing tip is in the extended position, the wing-tip coupler is at least parallel to a segment of the bell crank that extends from the second bell-crank end to the fixed pivot point of the bell crank.

6. The wing of claim 1, wherein each one of the upper wing-tip panel and the lower wing-tip panel is pivotable, relative to the wing tip, about a corresponding one of two panel axes as the wing tip is pivoted between, and inclusive of, the extended position and the retracted position.

7. The wing of claim 6, wherein:

the wing tip comprises a panel cutout defined by a panel-attachment edge and a panel-abutment edge; and
each one of the upper wing-tip panel and the lower wing-tip panel comprises a tip-attachment edge, a tip-abutment edge, a wing-abutment edge, and a trailing edge;

wherein when in the extended position:
each one of the upper wing-tip panel and the lower wing-tip panel is pivotally attached to the panel-attachment edge of the wing tip by the tip-attachment edge;
the tip-abutment edge is laterally aligned with the panel-abutment edge of the wing tip; and
the wing-abutment edge is laterally aligned with the distal end of the wing root.

8. The wing of claim 6, wherein the two panel axes are spaced apart from and parallel to each other.

9. The wing of claim 8, further comprising:

an upper rod comprising a first upper-rod end and a second upper-rod end; and
a lower rod comprising a first lower-rod end and a second lower-rod end;

wherein:
the first upper-rod end is mounted to the wing root at a first location and the second upper-rod end is mounted to an interior surface of the upper wing-tip panel;
the first lower-rod end is mounted to the wing root at a second location and the second lower-rod end is mounted to an interior surface of the lower wing-tip panel; and
the first location on the wing root is below the second location on the wing root.

10. The wing of claim 1, wherein the wing tip comprises a panel cutout defined by a panel-attachment edge and a panel-abutment edge, and when in the retracted position, the panel-abutment edge of the wing tip is adjacent to the trailing edge of the wing root.

11. A wing-tip assembly comprising:

a wing tip comprising a panel cutout defined by a panel-attachment edge and a panel-abutment edge, wherein the wing tip is pivotable about a wing-tip axis;

an upper wing-tip panel comprising a tip-attachment edge and a tip-abutment edge, the upper wing-tip panel being pivotable about a first panel axis that is angled relative to the wing-tip axis, wherein the upper wing-tip panel is pivotally attached to the panel-attachment edge of the wing tip by the tip-attachment edge of the upper wing-tip panel; and a lower wing-tip panel comprising a tip-attachment edge and a tip-abutment edge, the lower wing-tip panel being pivotable about a second panel axis that is parallel to the first panel axis, wherein the lower wing-tip panel is pivotally attached to the panel-attachment edge of the wing tip by the tip-attachment edge of the lower wing-tip panel;

wherein:
the wing tip is pivotable about the wing-tip axis, between, and inclusive of, an extended position and a retracted position;
when in the extended position, the tip-abutment edge of the upper wing-tip panel and the tip-abutment edge of the lower wing-tip panel are laterally aligned with the panel-abutment edge of the wing tip; and
when in the retracted position, the tip-abutment edge of the upper wing-tip panel and the tip-abutment edge of the lower wing-tip panel are unaligned with the panel-abutment edge, such that the tip-abutment edge of the upper wing-tip panel extends vertically upward from the panel-abutment edge of the wing tip and the tip-abutment edge of the lower wing-tip panel extends vertically downward from the panel-abutment edge of the wing tip.

12. The wing-tip assembly of claim 11, further comprising a wing-tip hinge defining the wing-tip axis and configured to pivotally couple the wing tip to a wing root.

13. The wing-tip assembly of claim 11, further comprising an actuator mechanically coupled to the wing tip and configured to be actuatable to pivot the wing tip, about the wing-tip axis between and inclusive of, the extended position and the retracted position.

14. The wing-tip assembly of claim 13, further comprising a bell crank comprising a first bell-crank end, configured to be mounted to the actuator, a second bell-crank end, mechanically coupled to the wing tip, and a fixed pivot point between the first bell-crank end and the second bell-crank end, the fixed pivot point defining a bell-crank axis that is parallel to the wing-tip axis, and pivotally coupling the bell crank to a bell-crank hinge that is configured to be mounted to a wing root.

15. The wing-tip assembly of claim 14, further comprising a wing-tip coupler comprising a first coupler end, mounted to the second bell-crank end of the bell crank, and a second coupler end, mounted to the wing tip.

16. The wing-tip assembly of claim 11, further comprising:
an upper rod comprising a first-upper rod end, configured to be mounted to a wing root, and a second-upper rod end, mounted to the upper wing-tip panel, the upper rod configured to pivot the upper wing-tip panel about the first panel axis; and
a lower rod comprising a first-lower rod end, configured to be mounted to the wing root, and a second-lower rod end, mounted to the lower wing-tip panel, the lower rod configured to pivot the lower wing-tip panel about the second panel axis.

17. The wing of claim 1, wherein:
the wing tip is further coupled with the wing root at a second attachment member of the wing tip;
the second attachment member moves relative to the wing root as the wing tip pivots about the wing-tip axis; and
the wing-tip axis is fixed relative to the wing root such that the wing-tip axis does not move relative to the wing root as the wing tip pivots about the wing-tip axis.

18. The wing of claim 17, wherein the wing-tip axis is located closer to the leading edge of the wing root than the second attachment member.

19. The wing of claim 2, further comprising at least three linkages that are interconnected with each other, pivotable relative to each other, and movable relative to the wing tip, wherein the second actuator end of the actuator is mechanically coupled to the wing tip via the at least three linkages.

20. The wing-tip assembly of claim 13, further comprising at least three linkages that are interconnected with each other, pivotable relative to each other, and movable relative to the wing tip, wherein the actuator end of the actuator is mechanically coupled to the wing tip via the at least three linkages.

21. A method of folding a wing tip of a wing, the method comprising:
pivoting the wing tip, relative to a wing root, about a wing-tip axis that is defined by a wing-tip hinge and is perpendicular relative to a spanwise direction and a chordwise direction of the wing, in an aft direction from an extended position to a retracted position;
pivoting the wing tip, relative to the wing root, about the wing-tip axis, in a forward direction, opposite of the aft direction, from the retracted position to the extended position pivoting of an upper wing-tip panel, relative to the wing root and the wing tip, about a first panel axis that is angled, relative to the wing-tip axis, in a first direction from the extended position to the retracted position;
pivoting a lower wing-tip panel, relative to the wing root and the wing tip, about a second panel axis that is parallel to the first panel axis, in a second direction, from the extended position to the retracted position;
inversely pivoting the upper wing-tip panel, relative to the wing root and the wing tip, about the first panel axis, in the second direction, from the retracted position to the extended position; and
inversely pivoting the lower wing-tip panel, relative to the wing root and the wing tip, about the second panel axis, in the first direction, from the retracted position to the extended position.

22. The method of claim 21, wherein:
an upper rod comprises a first upper-rod end, mounted to the wing root and a second upper-rod end, mounted to the upper wing-tip panel;
a lower rod comprises a first lower-rod end, mounted to the wing root, and a second lower-rod end, mounted to the lower wing-tip panel; and
the step of pivoting the upper wing-tip panel comprises adjusting an angle of the first upper-rod end, relative to the wing tip, such that the angle increases;
the step of pivoting the lower wing-tip panel comprises adjusting an angle of the first lower-rod end, relative to the wing tip, such that the angle increases;
the step of inversely pivoting the upper wing-tip panel comprises adjusting the angle of the first upper-rod end, relative to the wing tip, such that the angle decreases; and
the step of inversely pivoting the lower wing-tip panel comprises adjusting the angle of the first lower-rod end, relative to the wing tip, such that the angle decreases.

* * * * *